US008546744B2

(12) United States Patent
Yoshida et al.

(10) Patent No.: US 8,546,744 B2
(45) Date of Patent: Oct. 1, 2013

(54) ROTARY ENCODER, ROTARY MOTOR, ROTARY MOTOR SYSTEM, DISK, AND METHOD OF MANUFACTURING ROTARY ENCODER

(75) Inventors: Yasushi Yoshida, Kitakyushu (JP); Yuji Arinaga, Kitakyushu (JP); Shirou Yoshidomi, Kitakyushu (JP); Yosuke Yamaguchi, Kitakyushu (JP); Jiro Muraoka, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 417 days.

(21) Appl. No.: 12/882,211

(22) Filed: Sep. 15, 2010

(65) Prior Publication Data

US 2011/0069390 A1 Mar. 24, 2011

(30) Foreign Application Priority Data

Sep. 18, 2009 (JP) .................................. 2009-216447

(51) Int. Cl.
*G01D 5/34* (2006.01)
(52) U.S. Cl.
USPC .................................................. 250/231.13
(58) Field of Classification Search
USPC ........................................ 250/231.13–231.18
See application file for complete search history.

(56) References Cited

U.S. PATENT DOCUMENTS

| 4,253,021 A | | 2/1981 | Ernst |
| 5,428,217 A | * | 6/1995 | Nakajima et al. .......... 250/214.1 |
| 5,537,210 A | | 7/1996 | Kaneda et al. |

FOREIGN PATENT DOCUMENTS

| DE | 2758854 B1 | 2/1979 |
| DE | 3807011 C1 | 4/1989 |
| GB | 909916 | 11/1962 |
| JP | 06-347293 | 12/1994 |
| JP | 07-218237 | 8/1995 |
| JP | 09-133552 | 5/1997 |
| JP | 3509830 B2 | 5/1997 |
| JP | 2006-078178 | 3/2006 |
| WO | WO 2004/023079 | 3/2004 |

OTHER PUBLICATIONS

Machine translation of De 3807011 (English).*
Japanese Office Action for corresponding JP Application No. 2009-216447, Jul. 31, 2012.
Extended European Search Report for corresponding EP Application No. 10175633.6-2213, Sep. 20, 2012.

* cited by examiner

*Primary Examiner* — Alessandro Amari
(74) *Attorney, Agent, or Firm* — Ditthavong Mori & Steiner, P.C.

(57) ABSTRACT

An encoder includes a disc-shaped disk disposed so as to be rotatable about a rotation axis and having at least one ring-shaped track in which a rotating grating is formed and at least one fixed grating which is fixedly disposed opposed to the disk so that the fixed grating and the rotating grating construct a diffraction interference optical system. Each of a plurality of slits included in the at least one rotating grating is formed along a curved line obtained by making each of a plurality of radial lines using the rotation axis as a center curved in the circumferential direction at a predetermined curve degree so that a pitch of the slits can be set to a predetermined value.

17 Claims, 15 Drawing Sheets

1X SIGNAL

MIDDLE L SIGNAL

MIDDLE H SIGNAL

INCREMENTAL SIGNAL

ROTARY ENCODER, ROTARY MOTOR, ROTARY MOTOR SYSTEM, DISK, AND METHOD OF MANUFACTURING ROTARY ENCODER

CROSS-REFERENCE TO RELATED APPLICATIONS

The present application claims priority under 35 U.S.C. §119 to Japanese Patent Application No. 2009-216447, filed Sep. 18, 2009. The contents of this application are incorporated herein by reference in their entirety.

BACKGROUND OF THE INVENTION

1. Field of the Invention

The present invention relates to a rotary encoder, a rotary motor, a rotary motor system, a disk, and a method of manufacturing a rotary encoder.

2. Description of the Related Art

To measure physical amounts such as a position (angle) and velocity (rotation speed) of a rotating mobile body (rotating body), a rotary encoder is used. The encoders are largely divided into an incremental encoder and an absolute encoder. The incremental encoder mainly detects a relative position from the original position of a mobile body. Concretely, the incremental encoder detects the original position in advance, obtains a period signal such as a pulse signal according to a movement amount from the original position, and performs a process such as integration on the period signal, thereby detecting the position or the like. On the other hand, the absolute encoder is also called an absolute-value encoder and detects the absolute position of a mobile body.

SUMMARY OF THE INVENTION

Encoders of various detection principles have been developed and each type of encoders is properly selected and used according to characteristics required for usage. In particular, the encoder plays an important role, for example, of grasping a present position or the like for a servo motor or the like which performs position control, speed control, or the like. In other words, the performance and characteristics of an encoder which is selected and used for a motor even exert an influence on the performance and characteristics of the motor.

For example, as disclosed in Japanese Patent No. 3,509, 830 and Japanese Unexamined Patent Application Publication No. H06-347293, optical encoders using diffraction interference light formed by a plurality of slits (including a reflection type and a transmission type) have been developed as encoders realizing high resolution. However, in the encoders, a diffraction interference optical system is formed, so that it is difficult to perform miniaturization, designing, development, manufacture, and the like.

The present invention has been achieved in consideration of such problems and an object of the invention is to provide a rotary encoder, a rotary motor, a rotary motor system, a disk, and a method of manufacturing a rotary encoder realizing miniaturization and facilitated designing, development, manufacture and the like while improving resolution by using diffraction interference light.

To solve the problems, according to an aspect of the present invention, there is provided a rotary encoder including: a disc-shaped disk disposed rotatably about a rotation axis and having at least one ring-shaped track in which an optical rotating grating is formed; and at least one optical fixed grating disposed fixedly so as to face the disk so that the fixed grating and the rotating grating construct a diffraction interference optical system, wherein each of a plurality of slits included in the rotating grating in the at least one track is formed along a curved line obtained by making each of a plurality of radial lines using the rotation axis as a center curved in the circumferential direction at a predetermined curve degree so that a pitch of the slits can be set to a predetermined value.

To solve the problems, according to still another aspect of the invention, there is provided a rotary motor system including: a motor unit that rotates a rotary shaft; a rotary encoder that is coupled to the rotary shaft and measures a position of the rotary shaft; and a controller that controls rotation of the motor unit based on the position detected by the rotary encoder, wherein the rotary encoder includes: a disc-shaped disk disposed rotatably about a rotation axis in accordance with rotation of the rotary shaft and having at least one ring-shaped track in which an optical rotating grating is formed; and at least one optical fixed grating disposed fixedly so as to face the disk so that the fixed grating and the rotating grating construct a diffraction interference optical system, and each of a plurality of slits included in the rotating grating in the at least one track is formed along a curved line obtained by making each of a plurality of radial lines using the rotation axis as a center curved in the circumferential direction at a predetermined curve degree so that a pitch of the slits can be set to a predetermined value.

To solve the problems, according to yet another aspect of the invention, there is provided a method of manufacturing a rotary encoder including a disc-shaped disk disposed rotatably about a rotation axis and having at least one ring-shaped track in which an optical rotating grating is formed, and at least one optical fixed grating disposed fixedly so as to face the disk so that the fixed grating and the rotating grating construct a diffraction interference optical system, the method including: a number-of-slits determining step of determining the number of a plurality of slits included in the rotating grating in the at least one track so as to obtain a desired period signal; a radial line setting step of setting a plurality of radial lines of the number equal to the number of slits determined in the number-of-slits determining step using the rotation axis as a center in the at least one track at equal angles around the rotation axis as a center; a curved-line setting step of setting a plurality of curved lines by making each of the plurality of radial lines curved in the circumferential direction at a predetermined curve degree so that a pitch of the plurality of slits becomes a predetermined value in the at least one track; and a slit forming step of forming the plurality of slits in the at least one track along the plurality of curved lines.

According to the present invention described above, the pitch can be set to a proper value by properly setting the curve degree of the rotating grating formed along the curved line, so that the gap, the formation position of the rotating grating, and the like can be arbitrarily set. Therefore, while improving resolution by using diffraction interference light, the degree of freedom in designing and development can be increased. As a result, miniaturization of the device itself can be realized, and the diffraction interference optical system which is easily manufactured can be used.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
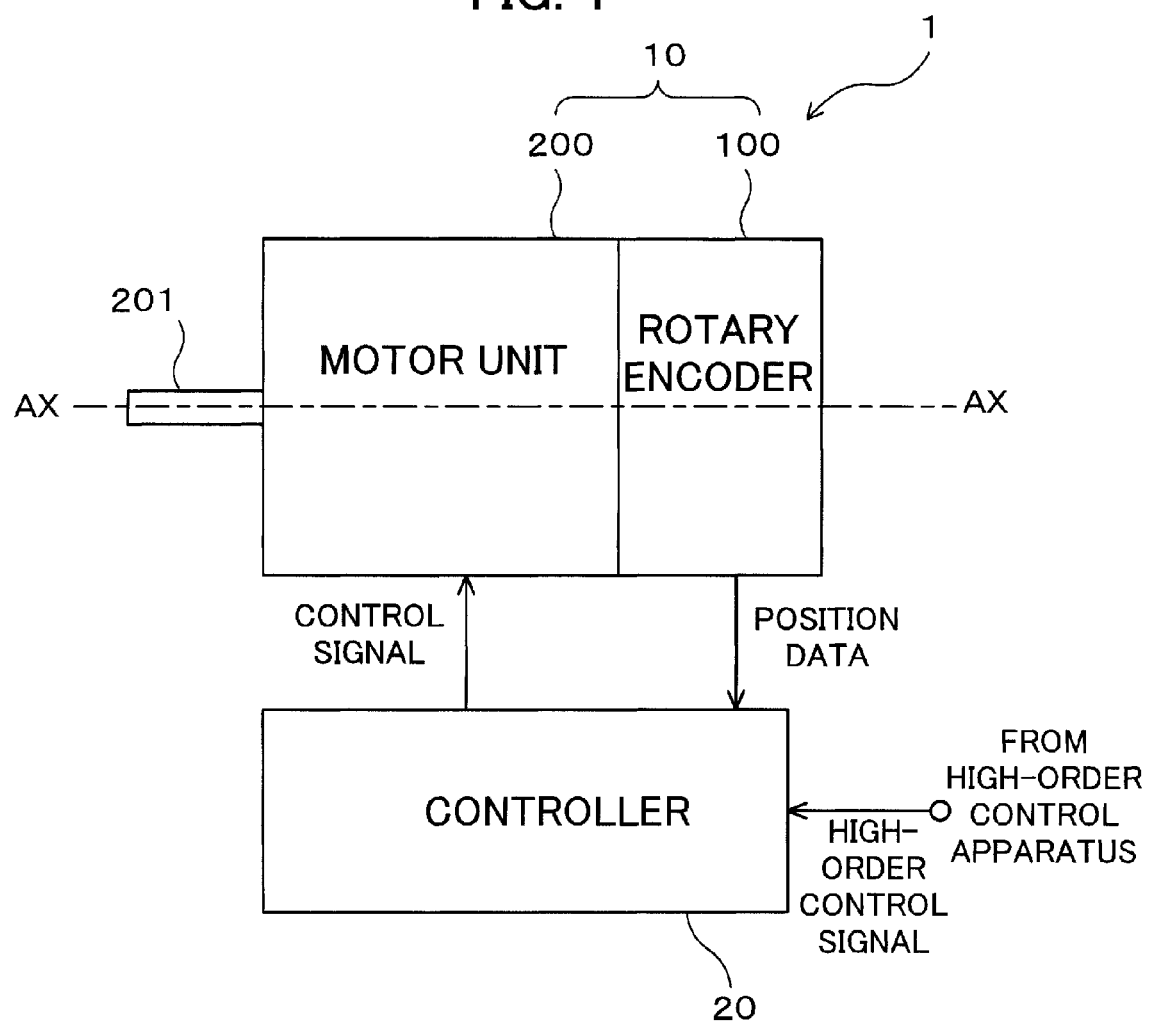
FIG. 1 is a diagram for explaining the configuration of a rotary motor system according to a first embodiment of the invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Prior to explanation of the embodiments of the present invention, outline of an optical encoder according to the techniques related to the embodiments will be described. An optical encoder using a grating formed by a plurality of slits (including a reflection type and a transmission type) is developed. Encoders using the optical grating are largely divided to a "geometric optics type" using light simply passing through or reflected from the grating and a "diffraction interference optical type" using diffraction interference light by the plurality of gratings (refer to, for example, Japanese Patent No. 3,509,830 and Japanese Unexamined Patent Application Publication No. H06-347293).

A geometric optics encoder receives light reflected by or passed through slits forming a grating without diffraction interference and specifies a positional change or the like by the number of light reception times or the like. The geometric optics encoder has a characteristic such that, in the case of setting slit intervals (hereinbelow, also called a "pitch p") of one grating to be constant, the longer the distance between the grating and another grating or a light receiver or the like (hereinbelow, also called a "gap g") becomes, the more the detection precision deteriorates.

On the other hand, in a diffraction interference optical encoder, diffraction interference light by a plurality of gratings is used, and a positional change or the like is specified by the number of times of receiving the diffraction interference light or the like. Therefore, the S/N (Signal to Noise) ratio of the diffraction interference optical encoder can be made higher than that of the geometric optics encoder. Moreover, the diffraction interference optical encoder has a characteristic such that even when the gap "g" is set to be relatively long, it does not easily exert influence on detection precision. It means that the possibility of occurrence of machine interference among the components is reduced, and resistance to environment such as a shock can be improved. As described above, the diffraction interference optical encoder has more advantageous points than the geometric optics encoder.

However, in the diffraction interference optical encoder, a diffraction interference optical system has to be constructed, so that the pitch "p" in each of a plurality of gratings (diffraction gratings) and the gap "g" as an interval of gratings are set to proper values. The relation between the pitch "p" and the gap "g" is a constraint in development and manufacture of the encoder itself. That is, when the pitch "p" or gap "g" is changed from a proper value, the quality of diffraction interference light deteriorates, and the S/N ratio of a period signal to be detected decreases. On the other hand, to maintain the pitch "p" or the gap "g" to a proper value, a diffraction interference optical system has to be designed/developed in consideration of the periodic number of the period signal (changing corresponding to the number of slits), the formation position of slits, or the like together with the pitch "p" and the gap "g".

Therefore, the degree of freedom is low, and design/development is not easy. Since adjustment is necessary for each diffraction interference optical system, manufacture is not also easy. Further, due to such constraints in design/development, it is difficult to miniaturize the device itself.

A constraint in the design, development, and manufacture can occur also in the case of using one set of a diffraction interference optical system for obtaining one period signal. However, particularly, in the case of using a plurality of sets of diffraction interference optical systems to obtain a plurality of period signals like in an absolute encoder, design, development, and manufacture have to be performed for each of the sets of diffraction interference optical systems, so that the degree of constraints on them is higher.

The inventors of the present invention keenly studied such optical encoders and, as a result, invented a rotary encoder and the like according to embodiments, realizing miniaturization and facilitated designing, development, manufacture, and the like while improving resolution by using diffraction interference light. In the following, embodiments of the present invention will be described in detail.

In each of the embodiments of the invention to be described below, a rotary motor system having an absolute rotary encoder will be described as an example. Specifically, a rotary encoder according to each of the embodiments is applied to a rotary motor and detects a rotation angle θ of the rotary motor as a position "x". However, obviously, a rotary encoder according to any of the embodiments to be described below can be applied to various rotating bodies each of which rotates about a predetermined rotation axis such as a prime mover or a steering.

The embodiments of the present invention will be described in the following order for easier understanding.
1 first embodiment
1-1 rotary motor system according to first embodiment
1-2 rotary encoder according to first embodiment
1-2-1 disk 110
   tracks TA to TC
   shapes of slits S
   magnet MG
1-2-2 detector MX and detectors 130A to 130C
   1× detecting mechanism
   optical detecting mechanism
1-2-3 configuration of curved slit
   curved slit in one track T
   positional relation between curved slit and slit on fixed grating side
   curved slits in relation among a plurality of tracks
1-2-4 position data generator 140
1-3 operation of rotary motor system according to first embodiment
1-4 method of manufacturing rotary encoder according to first embodiment
1-5 example of effect produced by rotary encoder system according to first embodiment
1-6 example of rotary encoder according to first embodiment
2 second embodiment
3 third embodiment

1 First Embodiment

1-1 Rotary Motor System According to First Embodiment

First, with reference to FIG. 1, the configuration of a rotary motor system according to a first embodiment of the present invention will be described. FIG. 1 is a diagram for explaining the configuration of the rotary motor system according to the first embodiment of the invention.

As shown in FIG. 1, a rotary motor system (hereinbelow, also simply called a "motor system") 1 according to the embodiment has a rotary motor (hereinbelow, also simply called a "motor") 10 and a controller 20. The motor 10 has a rotary encoder (hereinbelow, also simply called an "encoder") 100 and a rotary motor unit (hereinbelow, also simply called a "motor unit") 200.

The motor unit 200 is an example of a power generation source which does not include the encoder 100. The motor unit 200 may be also simply called a motor. The motor unit 200 has, at least on one side, a rotary shaft 201 and outputs rotational force by making the rotary shaft 201 rotate about a rotation axis AX.

The motor unit 200 is not limited as long as it is a servo motor which is controlled based on position data. The motor unit 200 is not limited to an electric motor using electricity as a power source but may be a motor unit using another power source such as a hydraulic motor unit, an air motor unit, or a steam motor unit. For convenience of explanation, the case where the motor unit 200 is an electric motor unit will be described below.

The encoder 100 is disposed on the side opposite to the rotary shaft 201 of the motor unit 200, and is coupled to another rotary shaft (a rotary shaft 202 in FIG. 2) rotating in correspondence with the rotary shaft 201. The encoder 100 detects the position of the rotary shaft 202, thereby detecting the position x (also called the rotation angle θ, the position x of the motor unit 200, or the like) of the rotary shaft 201 from which a rotational force is outputted, and outputs position data expressing the position x.

The encoder 100 may detect, in addition to or in place of the position x of the motor unit 200, at least one of velocity "v" of the rotary shaft 201 (also called rotational speed, angular speed, velocity "v" of the motor unit 200, or the like) and acceleration "a" (also called rotational acceleration, angular acceleration, acceleration "a" of the motor unit 200, or the like). In this case, the velocity "v" and the acceleration "a" of the motor unit 200 can be detected by a process of differentiating the position "x" with time once or twice or counting a period signal to be described later in predetermined intervals. For convenience of explanation, in the following description, the physical amount detected by the encoder 100 is the position "x".

The disposing position of the encoder 100 is not limited. For example, the encoder 100 may be disposed so as to be directly coupled to the rotary shaft 201 or may be coupled to a rotating body such as the rotary shaft 201 via another mechanism such as a reducer or a rotation direction converter.

The controller 20 obtains position data outputted from the encoder 100 and, based on the position data, controls rotation of the motor unit 200. Therefore, in the embodiment in which an electric motor is used as the motor unit 200, the controller 20 controls the rotation of the motor unit 200 by controlling current, voltage, or the like applied to the motor unit 200 based on the position data. Further, the controller 20 can also control the motor unit 200 so as to obtain a higher-order control signal from a higher-order control apparatus (not shown) and output a position, a velocity, or the like expressed by the higher-order control signal from the rotary shaft 201 of the motor unit 200. In the case where the motor unit 200 uses different power sources such as a hydraulic power source, an air power source, and a steam power source, by controlling supply of these power sources, the controller 20 can control the rotation of the motor unit 200.

1-2 Rotary Encoder According to First Embodiment

Figure 2:
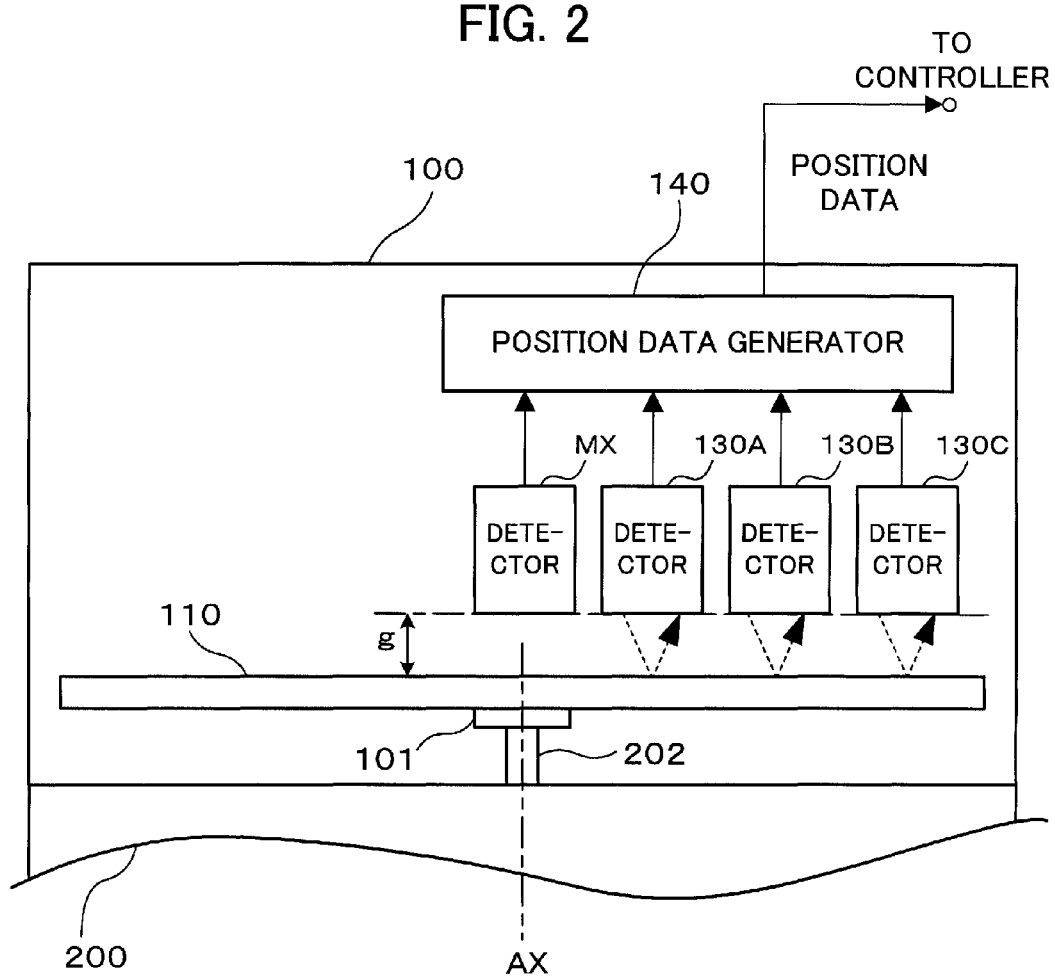
FIG. 2 is a diagram for explaining the configuration of a rotary encoder according to the embodiment.
Figure 3:
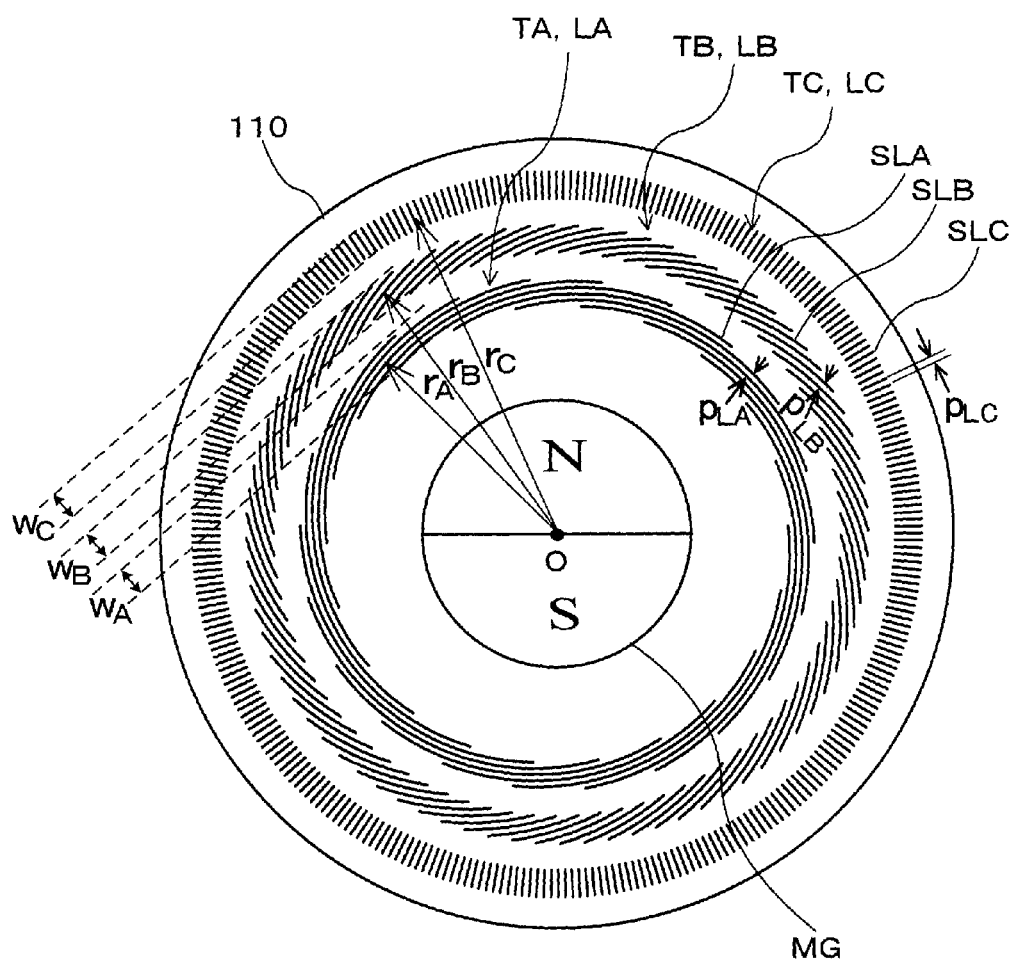
FIG. 3 is a diagram for explaining a disk of the rotary encoder according to the embodiment.

Next, with reference to FIGS. 2 and 3, the configuration of the encoder 100 according to the embodiment will be described. FIG. 2 is a diagram for explaining the configuration of the rotary encoder according to the embodiment. FIG. 3 is a diagram for explaining a disk of the rotary encoder according to the embodiment.

As shown in FIG. 2, the encoder 100 according to the embodiment has a rotary shaft 101, a disk 110, a detector MX, detectors 130A, 130B, and 130C, and the position data generator 140.

1-2-1 Disk 110

The disk 110 is formed in a disc shape as shown in FIG. 3 and disposed so that disk center O almost matches the rotation axis AX. The disk 110 is coupled to the rotary shaft 202 corresponding to the rotary shaft 201 of the motor unit 200 via the rotary shaft 101 which can rotate about the rotation axis AX. Therefore, the disk 110 is disposed rotatably about the rotation axis AX in accordance with rotation of the motor unit 200.

As shown in FIG. 3, the disk 110 has tracks TA to TC and a magnet MG.

The embodiment is described using the absolute encoder 100 as an example, so that the disk 110 has the three tracks TA to TC to accurately detect the absolute position "x" in rotation of the motor unit 200. The number of tracks T is not limited to three but is properly set to a plurality of pieces in accordance with detection precision required for the absolute value "x" or signal process. In the case where the embodiments of the invention are applied to the incremental encoder 100, the number of the tracks T may be at least one if a curved slit which will be described later is provided.

Tracks TA to TC

The tracks TA, TB, and TC are set in a ring shape around the disk center O of the disk 110 as a center and have predetermined widths $w_A$, $w_B$, and $w_C$, respectively. In the embodiment, the widths $w_A$, $w_B$, and $w_C$ of the tracks TA, TB, and TC are set to the same width w ($w = w_A = w_B = w_C$).

The tracks TA, TB, and TC are disposed so that their positions in the radial direction (track radii $r_A$, $r_B$, and $r_C$) in the center of their widths w are different from each other. In other words, the tracks TA, TB, and TC are formed in a concentrically shape using the disk center O as a center and disposed in this order from the disk center O toward the outer periphery ($r_A < r_B < r_C$).

Although the case where the widths $w_A$, $w_B$, and $w_C$ of the tracks TA, TB, and TC are the same has been described in the embodiment, the track widths $w_A$, $w_B$, and $w_C$ may be different from each other.

As shown in FIG. 3, optical rotating gratings LA, LB, and LC (optical diffraction gratings which are rotating) are formed in the tracks TA, TB, and TC, respectively.

The rotating gratings LA, LB, and LC have a plurality of optical slits SLA, SLB, and SLC, respectively, and serve as a part of individual diffraction interference optical systems independent of each other for the rotating grating LA, LB, and LC.

Each of the slits SLA to SLC is formed so as to reflect light (reflection slit) or transmit light (transmission slit).

In the case where each of the slits SLA to SLC is formed as a reflection slit, the slit SL may be formed by a method of vapor-depositing, for example, a material having high reflectance. On the other hand, the portion other than the slits SLA to SLC in the disk 110 may be formed by a method of, for example, applying a material which absorbs light by deposition or the like or using a material that transmits light for the disk 110 itself. It is also possible to use a material reflecting light to the disk 110 itself and process the portion other than the slits SLA to SLC by etching or the like. Further, it is also possible to form the slits SLA to SLC and the portion other than the slits SLA to SLC by a material having high reflectance and, then, form steps in the gap direction in the slits SLA to SLC and the portion other than SLA to SLC, thereby forming slits as a phase diffraction grating.

On the other hand, in the case where each of the slits SLA to SLC is formed as a transmission slit, the disk 110 itself is made of a material which transmits light. The portion other than the slits SLA to SLC may be formed by a method of, for example, applying a material which blocks light by absorption, reflection, or the like or performing a process of blocking light on the portion other than the slits SLA to SLC. The method of forming the slits SLA to SLC is not limited.

In short, in the case of the reflection-type slits, the slits SLA to SLC reflect light and the other portion does not reflect light. In the case of the transmission-type slits, the slits SLA to SLC transmit light and the other portion blocks light.

In the following, for convenience of explanation, the case where the slits SLA to SLC in the tracks TA to TC in the disk 110 are reflection slits will be described. As described above, in the case where reflection slits are used for the disk 110, a diffraction interference optical system of the reflection type can be formed. Consequently, as compared with the case where transmission slits are used for the disk 110, the influence on noise or detection precision due to fluctuations in the gap "g" between the disk 110 and a mask 120 which will be described later can be reduced.

Desirably, the tracks TA to TC are formed so that the larger the track radii $r_A$ to $r_C$ is, the larger the numbers $n_A$ to $n_C$ of the slits SLA to SLC is. That is, since the relation of track radii is "$r_A < r_B < r_C$", the numbers of slits in the tracks TA to TC are set so as to satisfy "$n_A < n_B < n_C$". From the tracks TA to TC, three period signals of the repetition numbers according to the numbers $n_A$ to $n_C$ of slits are obtained. The repetition numbers per rotation (360°) of the disk 110 in the three period signals are also called the numbers $m_A$ to $m_C$ of cycles. That is, the numbers $m_A$, $m_B$, and $m_C$ of cycles are numbers according to the numbers $n_A$, $n_B$, and $n_C$ of slits, respectively. Therefore, desirably, the numbers $n_A$, $n_B$, and $n_C$ of slits in the tracks TA, TB, and TC are set to numbers according to required resolutions so that the absolute position "x" can be detected with required precision.

In the embodiment, pitches $p_{LA}$, $p_{LB}$, and $p_{LC}$ as intervals of the slits SLA, SLB, and SLC in the tracks TA, TB, and TC are set to almost the same pitch $p_L$ in the tracks TA, TB, and TC ($p_L = p_{LA} = p_{LB} = p_{LC}$). It is sufficient that the pitches $P_{LA}$ to $P_{LC}$ in two or more tracks TA to TC are almost the same, and a track of a different pitch may be included. By setting the pitches $P_{LA}$ to $P_{LC}$ in the plurality of tracks TA to TC to be almost the same, the diffraction interference optical systems in the plurality of tracks TA to TC can be formed similarly, so that designing, development, and manufacture (also described as "manufacture and the like") can be facilitated. In particular, by setting the pitches $P_{LA}$ to $P_{LC}$ in all of the tracks TA to TC to be almost the same as in the embodiment, the manufacture and the like can be largely facilitated. In the embodiment, the expression "pitches $P_{LA}$ to $P_{LC}$" denotes intervals between neighboring slits in the slits SLA to SLC. That is, each of the pitches $P_{LA}$ to $P_{LC}$ denotes a distance between centers in slits.

Shapes of Slits S

The shape of slits SLA to SLC in the tracks TA to TC will now be described.

In the track TC disposed in the outermost periphery, the slits SLC are formed on radial lines (radial line LINE1 in FIG. 6) which are set at equal intervals about the disk center O (rotation axis AX) as a center. The slits in such a form will be also called "radial slits".

On the other hand, in the encoder 100 according to the embodiment, as described above, the pitches $P_{LA}$ to $P_{LC}$ in the plurality of tracks TA to TC can be adjusted to the pitch $p_L$ and, further, to largely facilitate miniaturization, manufacture, and the like, the slits SLA and SLB in the tracks TA and TB are formed as "curved slits" different from the radial slits. The slit SLC in the track TC may be formed by a curved slit. That is, at least any one of the plurality of tracks TA to TC may be formed by curved slits. In the case where the curved slits are included, facilitation of adjustment, miniaturization, manufacture, and the like of the pitches $P_{LA}$ to $P_{LC}$ can be realized. The curved slit will be described in detail later.

The pitches $P_{LA}$ to $P_{LC}$ in the radial slits and the curved slits in the embodiment denote intervals (pitches) of slits in the center of widths $w_A$ to $w_C$ of the tracks T.

Magnet MG

The magnet MG is a part of an example of a one-rotation detecting mechanism for detecting a rough absolute position x in one rotation. The magnet MG is disposed so that both magnetic poles (N pole and S pole) are positioned symmetrically so as to sandwich the disk center O (rotation axis AX) in a direction parallel to a disk surface. In the case where a one-rotation detecting mechanism different from that of the embodiment is used, the configuration of the magnet MG may be changed according to the mechanism (for example, a third embodiment or the like).

The one-rotation detecting mechanism will be also written as "1× detecting mechanism".

On the other hand, in the embodiment, the numbers $n_A$ to $n_C$ of slits in the tracks TA to TC are set so as to satisfy "$n_A < n_B < n_C$" as described above. The numbers $m_A$ to $m_C$ of cycles of period signals obtained from the tracks TA, TB, and TC express position detection precisions in the tracks TA, TB, and TC and correspond to the numbers $n_A$, $n_B$, and $n_C$ of slits, respectively.

In other words, the 1× detecting mechanism detects a rough absolute position "x" in one rotation as described above.

On the other hand, a detecting mechanism using the track TA can detect the absolute position "x" in a range narrower than one rotation with precision higher than the 1× detecting mechanism. The detecting mechanism using the track TA is also called a "middle L (low) detecting mechanism".

A detecting mechanism using the track TB can detect the absolute position "x" in a range narrower than that in the middle L detecting mechanism with precision higher than the middle L detecting mechanism. The detecting mechanism using the track TB is also called a "middle H (high) detecting mechanism".

Further, a detecting mechanism using the track TC can detect the absolute position "x" in a range narrower than that in the middle H detecting mechanism with precision higher than the middle H detecting mechanism. The detecting mechanism using the track TC is also called an "incremental detecting mechanism".

That is, the absolute encoder 100 according to the embodiment processes the detection positions "x" in the 1×, middle L, middle H, and incremental detecting mechanisms, thereby detecting the absolute position "x" with precision equivalent to the detection precision of the incremental detecting mechanism.

Each of the middle L detecting mechanism, the middle H detecting mechanism, and the incremental detecting mechanism has a diffraction interference optical system. Although the numbers $n_A$ to $n_C$ of slits, the shapes of slits, and the like vary in the mechanisms, the diffraction interference optical systems are independent of one another. The mechanisms are similar with respect to the point such that an optical diffraction interference optical system is used as a detection principle. In the following, therefore, the middle L detecting mechanism, the middle H detecting mechanism, and the incremental detecting mechanism will be also generically called "optical detecting mechanisms".

1-2-2 Detector MX and Detectors 130A to 130C

Figure 4:
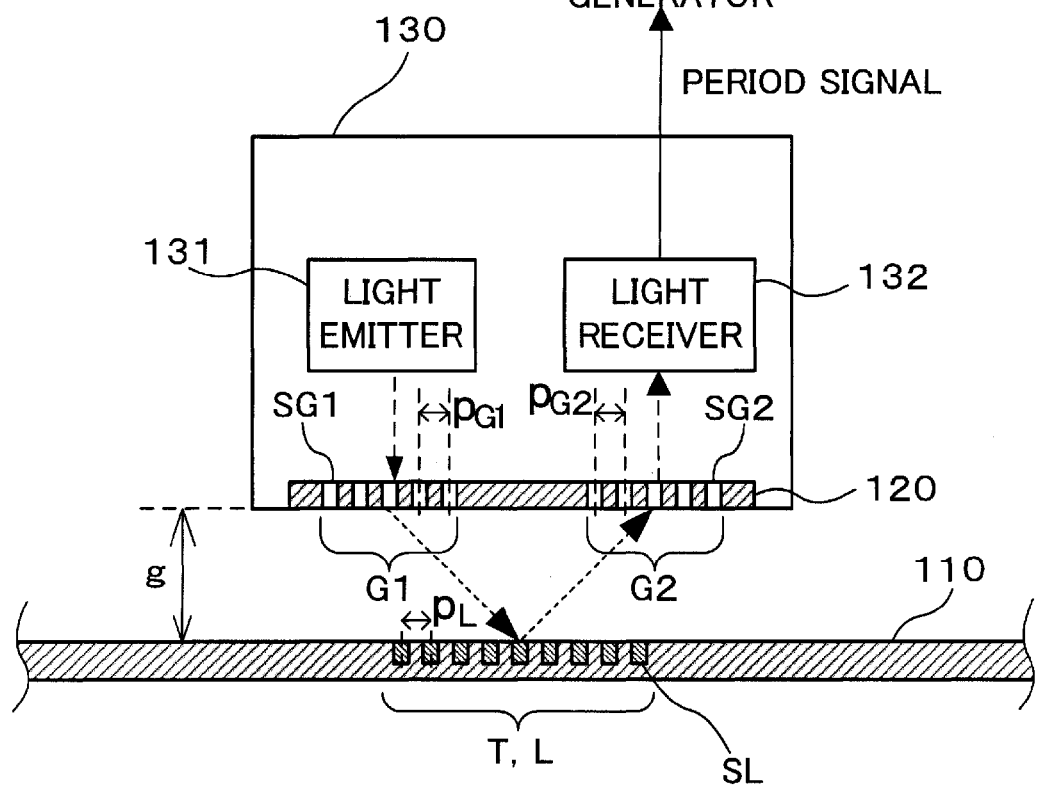
FIG. 4 is a diagram for explaining an optical detection mechanism of the rotary encoder according to the embodiment.
Figure 5:
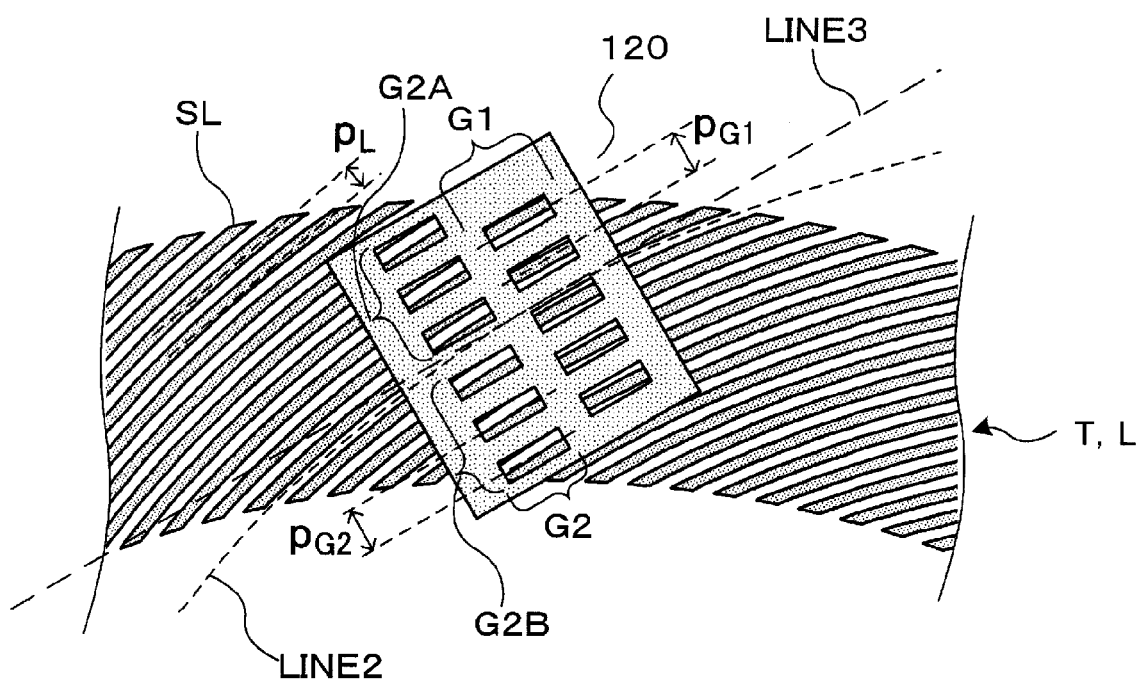
FIG. 5 is a diagram for explaining the optical detection mechanism of the rotary encoder according to the embodiment.

Next, with reference to FIGS. 2 to 5, the detector MX and the detectors 130A to 130C will be described and their detecting mechanisms will be described more concretely. FIGS. 4 and 5 are diagrams for explaining an optical detecting mechanism of the rotary encoder according to the embodiment.

1× Detecting Mechanism

The detector MX is disposed so as to face the magnet MG and construct a 1× detecting mechanism in cooperation with the magnet MG. The gap "g" between the detector MX and the magnet MG is set to the same as the gap "g" between the other detectors 130A to 130C and the disk 110 as shown in FIG. 2. As a result, the gaps "g" between the detector MX and the detectors 130A to 130C can be simultaneously adjusted, and the manufacture and the like is facilitated. The gap "g" with the detector MX can be made a value different from the gap "g" of the detectors 130A to 130C.

The detector MX detects rotation in the direction of the magnetic field of the magnet MG in accordance with rotation of the disk 110. The detector MX is not limited as long as it can detect the direction of the magnetic field. As an example of the detector MX, a magnetic angle sensor such as an MR (Magneto Resistive effect) element or a GMR (Giant Magneto Resistive effect) element can be used. The detector MX can detect rotation of the disk 110 by, for example, using a magnetic field detecting element such as a hall element, detecting intensities of magnetic fields in two axis directions perpendicular to the rotation axis AX, and calculating the direction of the magnetic field of the magnet MG based on a detection signal from the magnetic field detecting element.

A detection signal of the detector MX becomes an electric signal having a sine wave which rotates by 360° at an electric angle $\phi_x$ while the disk 110 rotates by 360° (rotation angle θ (position x)). The detection signal expresses a rough absolute position "x" in one rotation of the disk 110. An electric signal detected by the detector MX is also called a "1× signal". The 1× signal is outputted to the position data generator 140.

Optical Detecting Mechanism

The detector 130A is disposed so as to face the track TA. The detector 130A and the track TA construct the middle L detecting mechanism. The detector 130B is disposed so as to face the track TB. The detector 130B and the track TB construct the middle H detecting mechanism. The detector 130C is disposed so as to face the track TC. The detector 130C and the track TC construct the incremental detecting mechanism.

As described above, the optical detecting mechanisms in the detectors 130A to 130C are common with respect to the point that they have independent diffraction interference optical systems. Therefore, with reference to FIG. 4, one optical detecting mechanism will be described as an example. The different points among the optical detecting mechanisms will be described one by one later.

Accordingly, in the case of describing one optical detecting mechanism as an example, in the following, as shown in FIG. 4, a detector (detectors 130A to 130C), a track (tracks TA to TC), and a rotating grating (rotating gratings LA to LC) corresponding to the optical detecting mechanism will be also simply called a "detector 130", a "track T", and a "rotating grating L", respectively. The slits (slits SLA to SLC) included in the rotating grating L will be also simply called "slits SL". The pitches ($p_{LA}$ to $p_{LC}$) of the slits SL will be also simply called "pitches $p_L$", the number of slits (the number $n_A$ to $n_C$ of slits) will be also simply called "the number n of slits", and the number of cycles (the number $m_A$ to $m_C$ of cycles) of period signals obtained from the optical detecting mechanism will be also simply called the "number m of cycles".

As shown in FIG. 4, the detector 130 has the mask 120, a light emitter 131, and a light receiver 132.

The mask 120 is fixedly disposed so as to face the disk 110 with a gap "g" therebetween. The mask 120 is made of a material which blocks light and has two optical fixed gratings G1 and G2 (fixed diffraction gratings) having a plurality of slits SG1 and SG2 that transmit light. That is, the mask 120 transmits light through the slits SG1 and SG2 in the fixed gratings G1 and G2, and the fixed gratings G1 and G2 and the rotating grating L construct a diffraction interference optical system of three gratings.

In the embodiment, the fixed gratings G1 and G2 are formed in the same mask 120. The fixed gratings G1 and G2 may be formed in individual masks 120. In the case where the fixed gratings G1 and G2 are formed in individual masks 120, desirably, they are disposed so that the distance (gap g) between the fixed grating G1 and the rotating grating L and the distance (gap g) between the rotating grating L and the fixed grating G2 are equal to each other on one face side of the disk 110. When the two fixed gratings G1 and G2 with the same distance from the rotating grating L are used and reflection-type slits are used for the slits SL in the rotating grating L, even if the positional relation between the disk 110 and the detector 130 fluctuates, the gaps "g" between the fixed gratings G1 and G2 and the rotating grating L are always constant. Therefore, the influence of fluctuations in the gap "g" exerted on the diffraction interference optical system can be reduced.

The relations of the gaps "g" with respect to the detectors 130A to 130C in the optical detecting mechanisms will now be described.

In the embodiment, the pitches $p_{LA}$, $p_{LB}$, and $p_{LC}$ of the slits SLA, SLB, and SLC in the tracks TA, TB, and TC are almost equal to one another and are set to the same pitch $p_L$. Consequently, the gaps "g" between the detectors 130A, 130B, and 130C and the tracks TA, TB, and TC, that is, the disk 110 can be set almost equal to one another. That is, in the embodiment, the gaps "g" between the rotating grating LA and the fixed gratings G1 and G2 corresponding to the rotating grating LA, the gaps "g" between the rotating grating LB and the fixed gratings G1 and G2 corresponding to the rotating grating LB, and the gaps "g" between the rotating grating LC and the fixed gratings G1 and G2 corresponding to the rotating grating LC are set to be almost equal as shown in FIG. 2.

In the case of such setting, the diffraction interference optical systems according to the gap "g" with respect to the detectors 130A to 130C can be commonly designed and developed, and the gaps "g" at the time of manufacture can be adjusted simultaneously for the detectors 130A to 130C. Therefore, manufacture and the like can be facilitated. Since the gaps "g" of the detectors 130A to 130C are set equal to one another, by integrally forming the masks 120 of the detectors 130A to 130C shown in FIG. 4 and integrally constructing the detectors 130A to 130C, the manufacture and the like can be further facilitated.

Obviously, such effects are produced similarly only by equalizing the gaps "g" between any two rotating gratings out of the rotating gratings LA, LB, and LC (for example, one track and another track) and the fixed gratings G1 and G2 corresponding to the two rotating gratings. The optical detecting mechanisms with the equalized gaps "g" are desirably optical detecting mechanisms in which the pitches $p_L$ of the tracks T are set to be equal.

While describing the light emitter 131 and the light receiver 132, each of the fixed gratings G1 and G2 will be described.

The light emitter 131 has a light source and applies light toward the fixed grating G1 in the mask 120. The wavelength and intensity of light applied from the light emitter 131 are not limited but may be properly determined according to the characteristics of the diffraction interference optical system, required positional resolution, and the like. As emission light, diffusion light is used in the embodiment. By using the diffusion light, each of the slits SG1 in the fixed grating G1 which will be described later can be regarded as an almost line light source, and the diffraction interference effect can be increased. When the slits SG1 can be regarded as almost line light sources, parallel light, laser light, converging light, or the like can be used as emission light. Obviously, the light emitter 131 may have predetermined optical elements such as a diffusion lens according to the characteristics and the like of light used such as parallel light, laser light, converging light, or diffusion light.

The fixed grating G1 is formed in a position where light applied from the light emitter 131 is incident. The fixed grating G1 has a plurality of slits SG1 of the transmission type and makes incident light diffracted by the plurality of slits SG1. As a result, each of the slits SG1 can convert light applied to the disk 110 to light using the slit SG1 as an almost line light source.

The pitch $p_{G1}$ of the plurality of slits SG1 in the fixed grating G1 is set to satisfy the relation "$p_{G1}=i \times p_L$ (i=1, 2, 3, ...)" where pitch $p_L$ denotes the pitch of the plurality of slits SL in the rotating grating L. However, in particular, in the case of "i=1, 2", the intensity of a period signal obtained can be often made higher. Specifically, in the case of "i=2", the intensity of a period signal can be often made higher than "i=1". On the other hand, the number "m" of cycles of the period signal changes according to not only the number "n" of slits but also "i". Concretely, in the case of "i=1, 2", the number "m" of cycles becomes at least "m=2×n/i". In the following, for convenience of explanation, the case where "i=2", that is, "$p_{G1}=2p_L$" and "m=n" will be described.

Light passed through the fixed grating G1 spreads in the width direction of the fixed grating G1 in accordance with the incidence angle at the time of entering the fixed grating G1. Therefore, desirably, the width of the slit SL in the rotating grating L is set to be greater than that of the slit SG1 in the fixed grating G1 in order to improve signal intensity in consideration of the spread angle. At this time, by setting the width of the slit SL in the rotating grating L to be greater or smaller than a width by which it is expected that light passed through the fixed grating G1 reaches, stability of a signal against an error in mounting between the fixed grating G1 and the rotating grating L can be further improved.

Similarly, light reflected by the rotating grating L spreads in the width direction of the rotating grating L in accordance with the incidence angle at the time of entering the rotating grating L. Therefore, desirably, the width of the slit SG2 in the fixed grating G2 which will be described later is also set to be greater than that of the slit SL in the rotating grating L in order to improve signal intensity in consideration of the spread angle. At this time, by setting the width of the slit SL in the fixed grating G2 to be greater or smaller than a width by which it is expected that light reflected by the rotating grating L reaches, stability of a signal against an error in mounting between the fixed grating G2 and the rotating grating L can be similarly further improved.

Note that, obviously, the relation of widths of slits in the fixed gratings G1 and G2 and the rotating grating L is not limited when sufficient signal intensity can be assured and the stability of a signal against a mounting error can be also sufficiently assured.

Desirably, the plurality of slits SG1 in the fixed grating G1 are formed almost parallel to the slits SL in the opposed positions in order to increase the diffraction interference effect of the diffraction interference optical system formed together with another rotating grating L and the fixed grating G and to reduce noise.

Since the slits SLA and SLB in the rotating gratings LA and LB are curved slits as shown in FIG. 3, desirably, the plurality of slits SG1 and SG2 in the fixed gratings G1 and G2 of the detectors 130A and 130B are formed as curved slits so as to be parallel to the opposed curved slits. On the other hand, since the slits S in the rotating grating LC are radial slits, desirably, the plurality of slits SG1 and SG2 in the fixed gratings G1 and G2 in the detector 130C are formed as radial slits so as to be parallel to the opposed radial slits.

As also described in U.S. Pat. No. 5,559,600 on radial slits, the pitch $p_L$ of the radial slits is sufficiently shorter than the length of the whole circumference of the track T, so that the radial slits can be optically regarded as parallel slits. Therefore, the plurality of slits SG1 in the fixed grating G1 of the detector 130C corresponding to the radial slits can be made "parallel slits" parallel to each other. On the other hand, similarly, the plurality of slits SG1 in the fixed gratings G1 of the detectors 130A and 130B corresponding to the curved slits can also be made parallel slits as shown in FIG. 5. In this case, desirably, the parallel slits in the fixed grating G1 corresponding to the radial slits are disposed so as to be parallel to parallel slits in the case where the radial slits are regarded as the parallel slits. Desirably, the parallel slits in the fixed grating G1 corresponding to the curved slits are disposed so as to be almost parallel to tangent line LINE3 at least at one point in each of the curved slits, as shown in FIG. 5. By using the parallel slits in both of the fixed gratings G1 corresponding to the radial slits and the curved slits as described above, the same fixed grating G1 can be used as both of the fixed gratings G1. Manufacture and the like can be made easier and, moreover, the manufacture cost can be reduced.

As shown in FIG. 4, light diffracted by the fixed grating G1 is applied to the rotating grating L corresponding to the fixed grating G1. The light applied to the rotating grating L is reflected by the slits SL in the rotating grating L. In this case, the light reflected is further diffracted by the rotating grating L. The light diffracted by the rotating grating L is applied to the fixed grating G2.

The fixed grating G2 is formed in the position where the light diffracted by the rotating grating L is incident. The pitch $p_{G2}$ of the slits SG2 in the fixed grating G2 is set to be the same as the pitch $p_{G1}$ of the slits SG1 in the fixed grating G1. That is, in the embodiment, "$p_{G1}=p_{G2}=2\times p_L$". The shape of the slit SG2, the positional relation of the slit SG2 with respect to the slit SG1 in the fixed grating G1, and the like are similar to those of the slit SG2 in the fixed grating G1. The detailed description will not be therefore repeated.

The fixed grating G2 is, different from the fixed grating G1, divided in two or more regions (for example, regions G2A and G2B shown in FIG. 5). The slits SG2 are formed at the same pitch $p_{G2}$ in each of the regions, and the slits in the regions are deviated by "$p_{G2}/4$". For convenience of explanation, in the following, the case where the fixed grating G2 is divided in two regions G2A and G2B as shown in FIG. 5 will be described.

On the other hand, as shown in FIG. 4, the light diffracted by the rotating grating L is applied to the fixed grating G2. The light which is applied to the fixed grating G2 is in an interference pattern in which light diffracted by the plurality of slits SL in the rotating grating L interfere each other. The positions in light parts in the interference pattern shift according to changes in the positional relation between the fixed grating G1 and the rotating grating L when the disk 110 rotates. As a result, intensity of light passing through the slits SG2 in the regions G2A and G2B shifted by "$p_{G2}/4$" shifts by 90° and increases/decreases in a sine wave shape.

The light receiver 132 is disposed so as to receive the light passed through the slits SG2 in the fixed grating G2. The light receiver 132 has, for example, light receiving elements such as photodiodes and converts intensity of received light to an electric signal. In this case, the light receiver 132 has, for example, two light reception faces so that electric signals can be differently generated for the regions G2A and G2B.

An electric signal generated by the light receiver 132 becomes an electric signal having an almost sine wave shape at predetermined intervals (also called a "period signal") which is repeated each time the disk 110 moves only by an amount corresponding to the pitch p or the like. On the other hand, the period signals corresponding to the regions G2A and G2B are two period signals whose phases are out from each other by 90° similar to the intensities of light passing through the slits SG2 in the regions G2A and G2B.

The two period signals will be called an "A-phase period signal" and a "B-phase period signal". Two period signals obtained in each of the middle L detecting mechanism, the middle H detecting mechanism, and the incremental detecting mechanism will be called "middle L signals", "middle H signals", and "incremental signals", respectively.

As described above, in the optical detecting mechanism, a diffraction interference optical system of three gratings is constructed. Therefore, when an interference occurs due to the relations with the pitches $p_L$, $p_{G1}$, and $p_{G2}$ regardless of the size of the gap "g", a desired period signal can be detected.

In a geometric optics encoder, light passed through the slits $S_L$ is simply received. Consequently, the larger the gap "g" is formed, the more noise increases due to the influence of light on a diffraction component and a diffusion component, so that the gap "g" has to be made small. In contrast, in a diffraction interference optical system as described in the embodiment, the gap "g" between a fixed member and a rotating member can be made large. As a result, the degree of freedom of designing and development can be increased, and an inconvenience that the fixed member and the rotating member interfere each other due to an impact or the like can be reduced.

As described above, although the diffraction interference optical system of three gratings (the rotating grating L and the fixed gratings G1 and G2) is described as an example in the embodiment, the invention is not limited to the system. For example, by using a band-shaped light receiving element having a light reception face in the position of each of the slits SG2 in the fixed grating G2 in place of the fixed grating G2, a pseudo diffraction interference optical system of three gratings can be formed. Further, by using a band-shape or linear light emitting element or the like that emits light in the position of each of the slits SG1 in the fixed gating G1 in place of the fixed grating G1, a pseudo diffraction interference optical system of three gratings can be also formed. Obviously, if a similar diffraction interference optical system can be constructed, the number of gratings is not limited.

1-2-3 Configuration of Curved Slit

Figure 6:
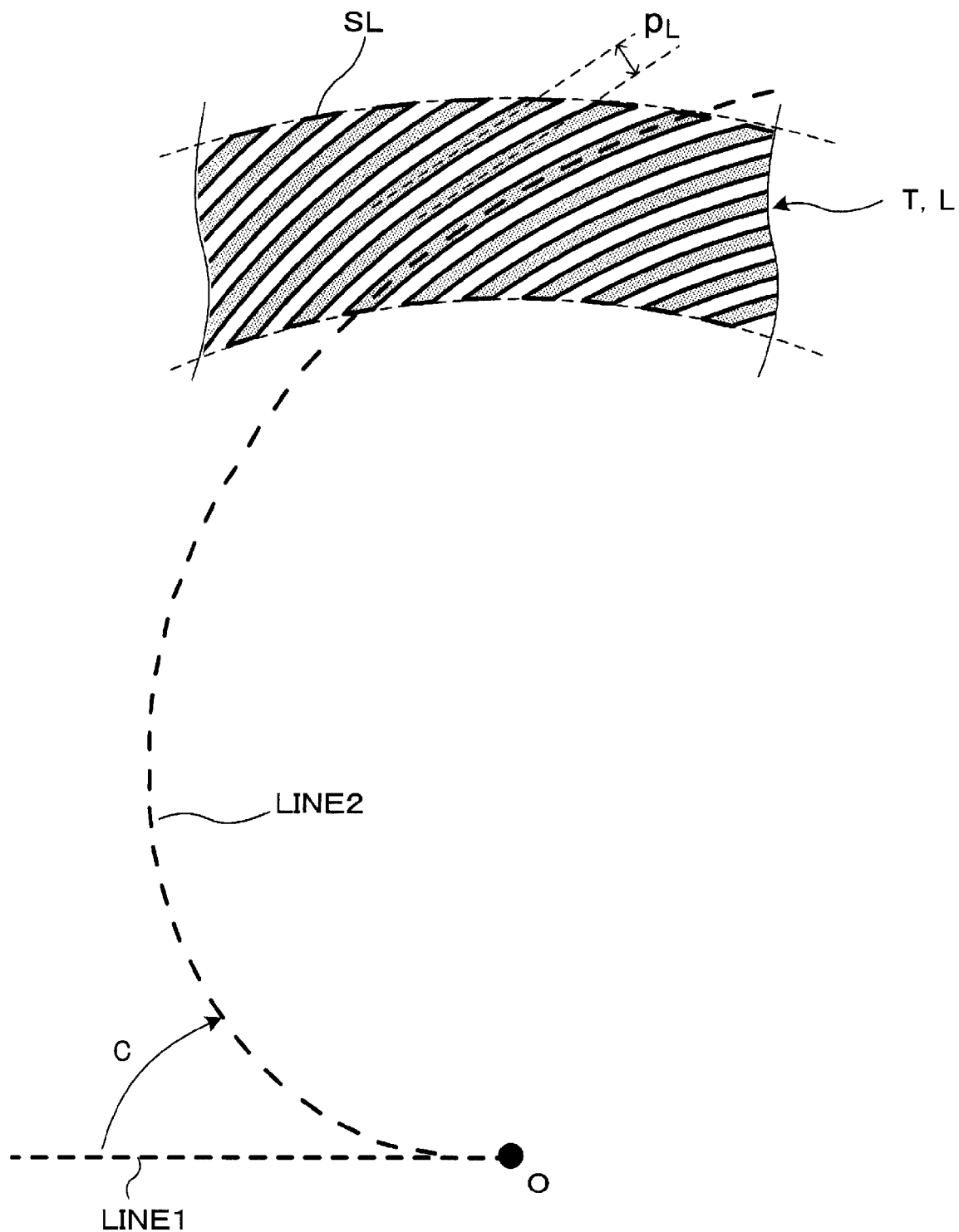
FIG. 6 is a diagram for explaining curved slits of the rotary encoder according to the embodiment.

The configuration of the rotary encoder 100 according to the first embodiment of the invention has been described above. Next, the curved slits used for the rotating gratings LA and LB will be described in detail with reference to FIGS. 5 and 6. FIG. 6 is a diagram for explaining a curved slit in the rotary encoder of the embodiment.

Curved Slit in One Track T

First, with reference to FIG. 6, one of curved slits, that is, the slit SLA in the rotating grating LA in the track TA or the slit SLB in the rotating grating LB in the track TB will be described as an example. The different points between the slits SLA and SLB will be described individually.

The slits SL in the rotating grating L according to the embodiment are arranged in the ring-shaped track T. As described above and as shown in FIG. 6, at least one slit SL in the rotating grating L is formed as a curved slit different from a radial slit.

The slit SL formed as a curved slit (here simply called a "slit SL") is formed along a curved line LINE2 obtained by making the radial line LINE1 whose center is the disk center O (rotation axis AX) curved at a predetermined degree C. of curve in the circumferential direction, as shown in FIG. 6.

Various formation examples of the slit SL along the curved line LINE2 are considered. An example of formation of the slit SL will be described as follows.

When the number of slits to be formed in the track T is "n", the number "n" of the radial lines LINE1 corresponding to the slits SL are set at angles obtained by equally dividing $2\pi$ (360°) by the number "n". After that, by making the radial lines LINE1 curved at the same curve degree C. in the same circumferential direction, the curved lines LINE2 of the slits SL are set. The slits SL are formed with predetermined width along the curved lines LINE2 which are set in such a manner.

A formation example of the slit SL using expressions will be concretely described.

The disk center O is set as the origin, the distance from the origin is set as 1, the angle from a reference line passing the origin is set as $\theta$, and the inside and outside diameters of the track T are set as $r_{IN}$ and $r_{OUT}$ respectively. The number of slits included in the rotating grating L of the track T is set as "n", and each of the slits is identified by "j" (j=0, 1, 2, ..., n−1). The radial line LINE1 is expressed in polar coordinates by the following expression 1.

$$LINE1 = (1, j \times 2\pi/n) \quad \text{Expression 1}$$

Where $r_{IN} \leq 1 \leq r_{OUT}$

In the case where the curve degree is C and the radius (radius in the center in the width direction of the track T) in which the pitch of a plurality of slits SL in the rotating grating L becomes desired $p_L$ is $r_0$, the curved line LINE2 is expressed in polar coordinates by the following expression 2. The slits SL are formed in a predetermined width w ($=r_{OUT}-r_{IN}$) of the track T along the curved line LINE2.

$$LINE2 = (r_0(1-C\theta), \theta + j \times 2\pi/n) \quad \text{Expression 2}$$

where $r_{IN} \leq r_0(1-C\theta) \leq r_{OUT}$

In the case of the example of the curved slit formation, the curve degree C. is expressed by the following expression 3.

$$C = \tan[\sin^{-1}\{p_L \times n/2\pi r_0\}] \quad \text{Expression 3}$$

Desirably, the track T is formed with width w ($=r_{OUT}-r_{IN}$) by which the amount of reflection light from the rotating grating L, which passed through the fixed grating G2 and, after that, was received by the light receiving element, becomes sufficient. In the diffraction interference optical system according to the embodiment, when the width w of the track T is set to, for example, about 20 to 50 times of the pitch $p_L$ of the rotating grating L, a sufficient light amount is obtained. Therefore, as understood from Expression 3, each of the slits SL as curved slits reaches from the position of the track inside radius ($r_{IN}$) to the track outer diameter ($r_{OUT}$) in a position within 180° at the angle $\theta$. Each of the curved slits SL is formed within 180° at the angle $\theta$ so as not to extend one rotation of the track T. By forming the curved slits in such a manner, the intensity of the disk 110 is enhanced, and formation of the slits SL can be facilitated.

On the other hand, in the diffraction interference optical system using the rotating grating L of the embodiment as a component, generally, the more the pitch of the plurality of slits SL included in the rotating grating L becomes uniform regardless of the position in the length direction of the slit SL, the more noise in a sine-wave period signal obtained can be reduced and position detection precision can be improved. In other words, the lower the increase ratio or decrease ratio of a deviation amount from the pitch $p_L$ with respect to a movement amount from the center of the width "w" of the track T toward the inside or outside of the track along the slit SL is, the more noise is suppressed and detection precision improves.

In contrast, since the curved slit of the embodiment is formed by making the slit SL curve, a change amount of the pitch (also called "pitch change rate") of the slits SL in the formation direction of the slit SL (the direction of the curved line LINE2) can be made low. As a result, in the encoder 100 of the embodiment, precision of detecting period signals obtained from the optical detecting mechanisms is improved and position detection precision can be improved.

More concretely, for example, in the case of a radial slit, a slit SL is formed on the radial line LINE1. However, the length in the formation direction of the slit SL (radial line LINE1) is almost equal to the width "w" of the track T, so that the change rate of the pitch of the slits SL in the formation direction is relatively high. The relatively high pitch change rate causes deterioration in period signal detection precision. The smaller the number "n" of slits is, the greater such deterioration in detection precision is. On the other hand, in the case of a curved slit, the length in the formation direction (curved line LINE2) of the slit SL can be increased by the amount of length corresponding to the curve degree C. as compared with the radial slit. As a result, the pitch change rate of the slits SL can be made relatively low, and the period signal detection precision can be improved.

Therefore, in the encoder 100 according to the embodiment, by using such a curved slit, the plurality of tracks TA, TB, and TC having different numbers "m" of cycles of period signals can be set without lowering the degree of freedom in designing, development, and the like and without deteriorating period signal detection precision. Thus, according to the embodiment, the high-precision small encoder 100 can be easily formed.

Further, generally, in the diffraction interference optical system, the optimum gap "g" between the rotating grating L and the fixed gratings G1 and G2 depends on wavelength $\lambda$ of light emitted from the light emitter 131 and the pitch $p_L$ of the plurality of slits SL in the rotating grid L. For example, in the optical system of three gratings, when k is a positive integer, in the case of $p_{G1} = p_L = p_{G2}$, the gap "g" becomes optimum when the following expression 4 is satisfied. In the case of $p_{G1} = 2 \times p_L = p_{G2}$, the gap "g" becomes optimum when the following expression 5 is satisfied.

$$g = (2 \times k - 1) \times p_L^2 / 4\lambda \quad \text{Expression 4}$$

$$g = (2 \times k) \times p_L^2 / \lambda \quad \text{Expression 5}$$

In contrast, the pitch pL of the plurality of slits SL as the curved slits in the embodiment is expressed by the following expression 6 using a function "f" with the number "n" of slits, the track radius r ($=r_0$), and the curve degree C.

$$p_L = f(n, r, C) \quad \text{Expression 6}$$
$$= (2\pi r/n) \times \sin(\tan^{-1} C)$$

Therefore, only by properly setting the curve degree C. without changing the number "n" of slits (i.e., corresponding to the cycles of period signals) and the track radius "r", the pitch "p" can be set to a value optimum for a diffraction interference optical system. As a result, the number "n" of tracks, the radius "r" of track, and the like can be freely set, miniaturization is easy, and designing, development, and the like is also facilitated.

In the case where the slits SL are formed so as to extend in the entire track T or longer different from the embodiment, such slits are also called "multiple spiral slits". In the case of such multiple spiral slits, the number of slits SL stacked in the radial direction is large, the width "w" of the track T is large, and miniaturization is difficult to be achieved. Therefore, the degree of freedom in designing and development decreases, and the manufacture itself becomes difficult. In contrast, the slit SL according to the embodiment is not the multiple spiral slit but is a curved slit. As a result, as described above, the degree of freedom in designing and development is high and manufacture and miniaturization are facilitated.

The formation example of the curved slits described above, the expression of the curved line LINE2, and the like are just examples, and such expressions do not have to be used. That is, as described above, as long as the slit SL along the curved line LINE2 curved in the circumferential direction is formed, the formation method, designing method, and the like of the slit SL are not limited.

Positional Relation Between Curved Slit and Slit on Fixed Grating Side

In the case of using parallel slits as the fixed gratings G1 and G2, as shown in FIG. 5, the fixed gratings G1 and G2 are disposed so that the tangent line LINE3 of the curved line LINE2 of the slit SL of the corresponding rotating grating L and each of the slits SG1 and SG2 are parallel to each other. When the curved slit as in the embodiment is used, even in the case where the arrangement positions of the fixed gratings G1 and G2 are deviated to a certain extent, since the change amount in the pitch $p_L$ of the curved slits is relatively small, a region in which the fixed gratings G1 and G2 as parallel slits and the rotating grating L are parallel to each other can be largely assured. Therefore, while further improving the period signal detection precision, manufacture and the like can be made very easy.

Curved Slits in Relation Among a Plurality of Tracks

The curved slit in one track T has been described above. Now, curved slits in the relation of the plurality of tracks TA and TB will be described with reference to FIGS. 2 and 3.

In the embodiment, as shown in FIG. 2, the gaps "g" between the rotating gratings LA to LC of all of the tracks TA to TC and the masks 120 of the detectors 130A to 130C are set almost equally. On the other hand, to form a diffraction interference optical system, it is important to realize the pitch $p_L$ of the slits SL corresponding to the gaps "g" so as to satisfy the expression 4 or 5.

In the embodiment, the curve degree C. in the slit SLA of the track TA is set so that, as shown in FIG. 3, the pitch $p_{LA}$ of the slit SLA becomes equal to the pitch $p_{LC}$ of the slit SLC in another track TC. Further, the curve degree C. in the slit SLB of the track TB is also set so that, as shown in FIG. 3, the pitch $p_{LB}$ of the slit SLB becomes equal to the pitch $p_{LC}$ of the slit SLC in another track TC.

On the other hand, the number $n_A$ of slits in the track TA is different from the number $n_B$ of slits in the track TB. Therefore, as understood also from the expression 3, the curve degree C. in the track TA is set so as to be different from the curve degree C. in the track TB. Thus, the pitch $p_{LA}$ in the track TA and the pitch $p_{LB}$ in the track TB in the neighboring curved slits can be made almost equal to each other.

As a result, the pitches $p_{LA}$ to $p_{LC}$ of the slits SLA to SLC in all of the tracks TA to TC can be made almost uniform. Therefore, the detectors 130A to 130C can be disposed with the uniform gap "g" while forming the diffraction interference optical systems. In this manner, in the case where the plurality of detectors 130A to 130C can be formed with the uniform gap "g", adjustment in the gap "g" direction of the detectors 130A to 130C is facilitated and, moreover, the detectors 130A to 130C can be also integrally formed. In the case where the detectors 130A to 130C are integrally formed, their masks 120 may be formed integrally as a single mask. In this case, the degree of freedom in designing and the like is improved and manufacture can be facilitated.

1-2-4 Position Data Generator 140

Next, the position data generator 140 as an undescribed component in the encoder 100 will be described with reference to FIG. 2 and FIGS. 7A to 7D.

The position data generator 140 obtains the 1× signal, middle L signal, middle H signal, and incremental signal each having a sine wave shape from the detector MX and the detectors 130A to 130C. The position data generator 140 specifies the absolute position "x" of the motor unit 200 from those signals and outputs position data indicative of the position "x". In the following, an example of a process of specifying the position "x" by the position data generator 140 will be described more concretely.

Each of the middle L signal, middle H signal, and incremental signal obtained by the position data generator 140 includes, as described above, two period signals of the A-phase period signal and the B-phase period signal whose phases are out by 90° in the embodiment.

On the other hand, the detector MX has two (or more) magnetic angle sensors detecting directions of magnetic fields different from each other by 90° and outputs two 1× signals (also called an A-phase 1× signal and a B-phase 1× signal) having the same period whose phases are out by 90° at an electric angle like the period signals. The 1× signal becomes a sine-wave electric signal which is repeated each time the disk 110 rotates once, so that it becomes a period signal. However, the detection principle and the like are different. For convenience of explanation, the 1× signal is discriminated from the middle L signal, the middle H signal, and the incremental signal. In the embodiment, the period signals simply refer to the middle L signal, the middle H signal, and the incremental signal but not the 1× signal.

The position data generator 140 obtains two sine-wave signals of the A-phase and the B-phase with respect to each of the 1× signal, the middle L signal, the middle H signal, and the incremental signal. The position data generator 140 performs a multiplying process or the like on the two sine-wave signals of the A-phase and B-phase for each of the 1× signal, middle L signal, middle H signal, and incremental signal, thereby generating signals which monotonically increase in the periods (or signals which monotonically decrease, which will be also called "monotonic increase signals" below).

In the following, the monotonic increase signal after the process of the 1× signal will be also simply called the 1× signal, the monotonic increase signal after the process of the middle L signal will be also simply called the middle L signal, the monotonic increase signal after the process of the middle H signal will be also simply called the middle H signal, and the monotonic increase signal after the process of the incremental signal will be also simply called the incremental signal.

Figure 7A:
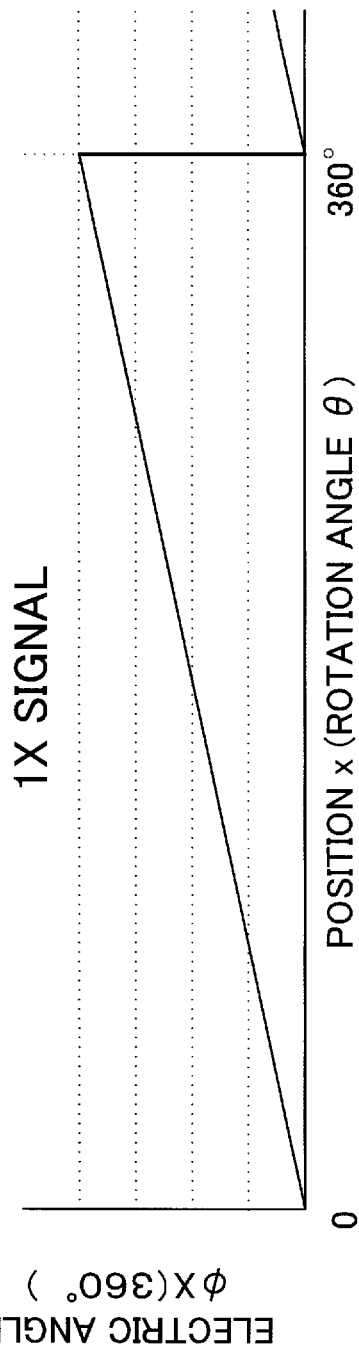
FIG. 7A is a diagram for explaining a position data generator of the rotary encoder according to the embodiment.
Figure 7B:
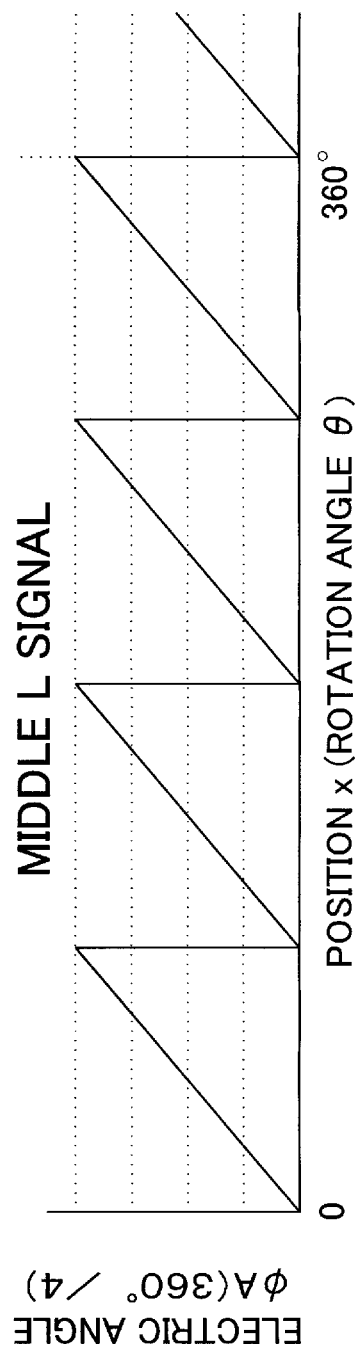
FIG. 7B is a diagram for explaining the position data generator of the rotary encoder according to the embodiment.
Figure 7C:
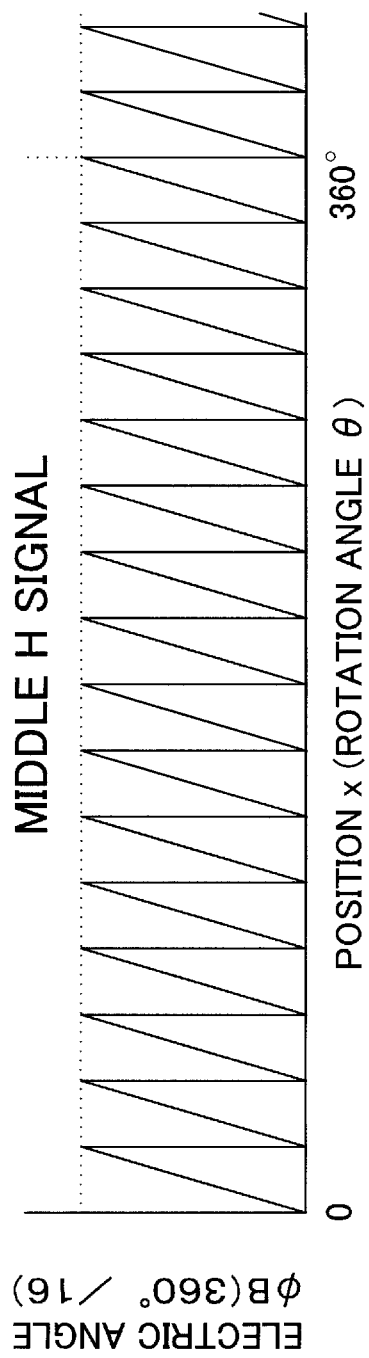
FIG. 7C is a diagram for explaining the position data generator of the rotary encoder according to the embodiment.
Figure 7D:
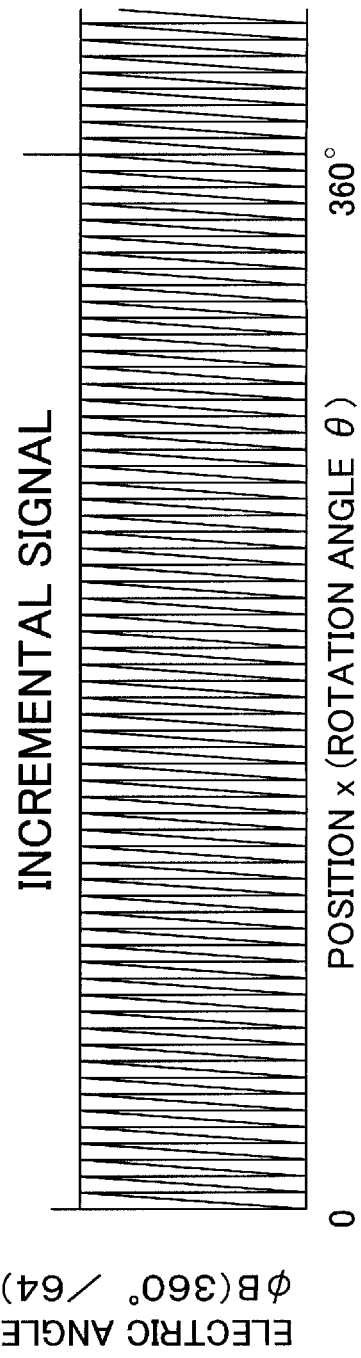
FIG. 7D is a diagram for explaining the position data generator of the rotary encoder according to the embodiment.

FIG. 7A shows an example of the 1× signal, FIG. 7B shows an example of the middle L signal, FIG. 7C shows an example of the middle H signal, and FIG. 7D shows an example of the incremental signal. In FIGS. 7A to 7C, the horizontal axis indicates the position "x" corresponding to a mechanical angle (angle θ), and the vertical axis indicates the electric angle φ in each of the signals. The electric angles of the 1× signal, the middle L signal, the middle H signal, and the incremental signal will be also expressed as $\phi_X$, $\phi_A$, $\phi_B$, and $\phi_C$, respectively.

FIG. 7A shows an example that the electric angle $\phi_X$ of the 1× signal changes by 360° once every 360° of rotation of the position x, that is, an example of monotone increase of once.

FIG. 7B shows an example that the electric angle $\phi_A$ of the middle L signal changes by 360° four times every 360° of rotation of the position x, that is, an example of a repetition of monotone increase of four times.

FIG. 7C shows an example that the electric angle $\phi_C$ of the middle H signal changes by 360° 16 times every 360° of rotation of the position x, that is, an example of a repetition of monotone increase of 16 times.

FIG. 7D shows an example that the electric angle $\phi_B$ of the incremental signal changes by 360° 64 times every 360° of rotation of the position x, that is, an example of a repetition of monotone increase of 64 times.

It means that the middle L signal, the middle H signal, and the incremental signal have position resolutions which are four times as high as those of the 1× signal, the middle L signal, and the middle H signal, respectively.

In the case where the pitches are set to "$p_{G1}=2\times p_L=p_{G2}$" like in the embodiment, the numbers $n_A$, $n_B$, and $n_C$ of slits in the tracks TA, TB, and TC are set to 4, 16, and 64, respectively, to realize such resolutions. However, those cases are just an example. The numbers $n_A$, $n_B$, and $n_C$ of slits in the tracks TA, TB, and TC are not limited but may be properly set according to desired numbers $m_A$, $m_B$, and $m_C$ of cycles required for the period signals obtained, respectively. In the case where the pitches are set to "$p_{G1}=2\times p_L=p_{G2}$" as in the embodiment, "$m_A=n_A$, $m_A=n_A$, and $m_A=n_A$". In the case where the pitches are set to "$p_{G1}=1\times p_L=p_{G2}$", "$m_A=2\times n_A$, $m_A=2\times n_A$, and $m_A=2\times n_A$". From those relations, the numbers $n_A$, $n_B$, and $n_C$ of slits according to the desired numbers $m_A$, $m_B$, and $m_C$ of cycles can be determined.

Although FIGS. 7A, 7B, and 7C show signals which linearly monotonically increase, the position data generator 140 may output signals, for example, which monotonically increase step by step as the 1× signal, the middle L signal, the middle H signal, and the incremental signal. The stair width in the position x direction has desirably a length corresponding to the period of a signal whose resolution corresponds to the period of a signal whose resolution is higher by one.

The position data generator 140 generates the 1× signal, the middle L signal, the middle H signal, and the incremental signal and, based on the signals, specifies the absolute position "x" of the motor unit 200.

More concretely, in the examples shown in FIGS. 7A to 7C, the position data generator 140 first specifies the positions every 90° in the mechanical angle of 360° from the 1× signal.

The position data generator 140 specifies the positions every (90/4)° in 90° by using the middle L signal.

Next, the position data generator 140 specifies the positions every (90/16)° in (90/4)° by using the middle H signal.

Finally, the position data generator 140 specifies the positions every (90/64)° in (90/16)° by using the incremental signal.

As a result, the position data generator 140 can specify the absolute position "x" of the motor unit 200 at resolution similar to that of the outermost incremental detection mechanism. The position data generator 140 outputs position data expressing the absolute position "x" specified in such a manner to the controller 20.

Without performing such a process, the position data generator 140 may store a table of the absolute positions "x" corresponding to combinations with the 1× signal, the middle L signal, the middle H signal, and the incremental signal and specify the absolute position "x" by using the table. Obviously, a process of the position data generator 140 described above may be performed by the controller 20. In this case, the position data generator 140 may output, as position data, the 1× signal and the period signals each having a sine wave shape or the 1× signal and period signals each monotonically increasing after a process of multiplying process or the like to the controller 20.

1-3 Operation of Rotary Motor System According to First Embodiment

Next, the operation of the motor system 1 according to the embodiment will be described. Since the operation, action, and the like of the components have been described above in detail, their description will not be repeated.

The controller 20 obtains a high-order control signal from a high-order control apparatus or the like and, further, obtains position data indicative of the absolute position "x" of the motor unit 200 from the encoder 100. The controller 20 generates a control signal based on a high-order control signal and the position data and outputs it to the motor unit 200.

As a result, the motor unit 200 rotates the rotary shaft 201 based on the control signal. The disk 110 in the encoder 100 coupled to the rotary shaft 202 corresponding to the rotary shaft 201 via the rotary shaft 101 is rotated. On the other hand, the detector MX and the detectors 130A to 130C detect the 1× signal and the period signals according to the rotation of the disk 110 and output them to the position data generator 140. The position data generator 140 generates position data based on the obtained signals and outputs it to the controller 20.

As described above, the encoder 100 according to the embodiment can detect the high-precision absolute position "x" of the motor unit 200 and supply it as position data to the controller 20. Therefore, based on the high-precision absolute position "x", the motor system 1 can control the position "x" of the motor unit 200 with high precision.

1-4 Method of Manufacturing Rotary Encoder According to First Embodiment

The rotary motor system according to the first embodiment of the invention has been described above.

Figure 8:
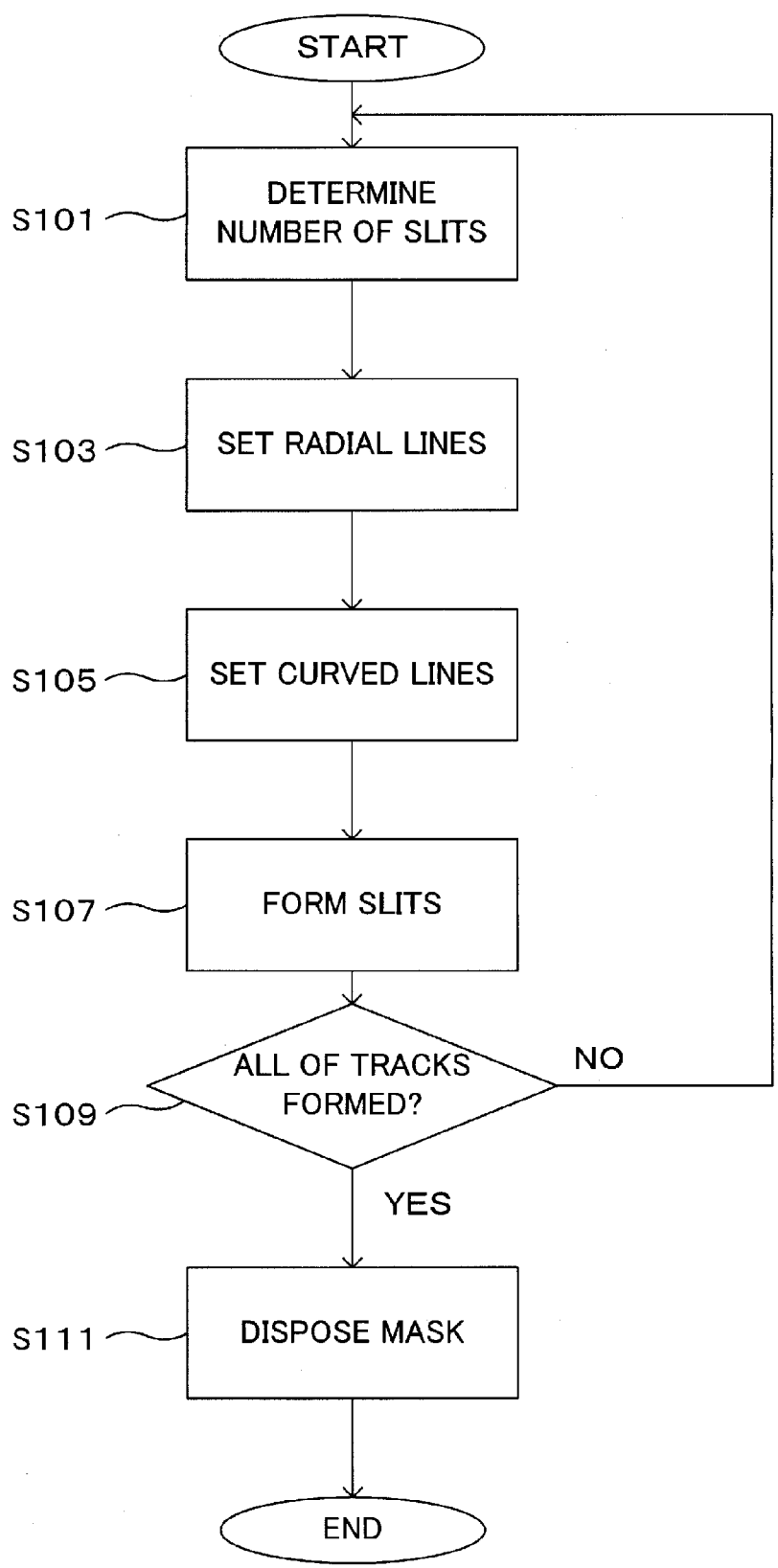
FIG. 8 is a flowchart for explaining a method of manufacturing the rotary encoder according to the embodiment.
Figure 9:
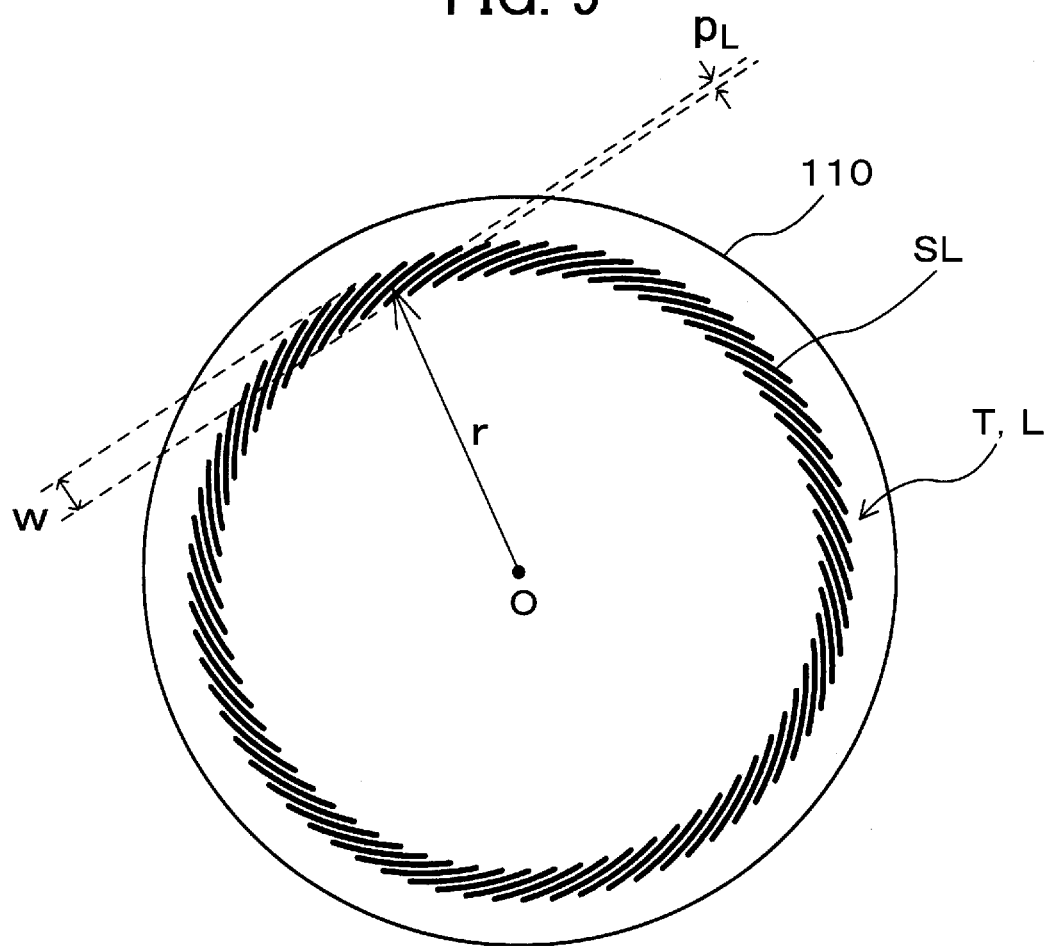
FIG. 9 is a diagram for explaining a disk of the rotary encoder according to the embodiment.
Figure 10:
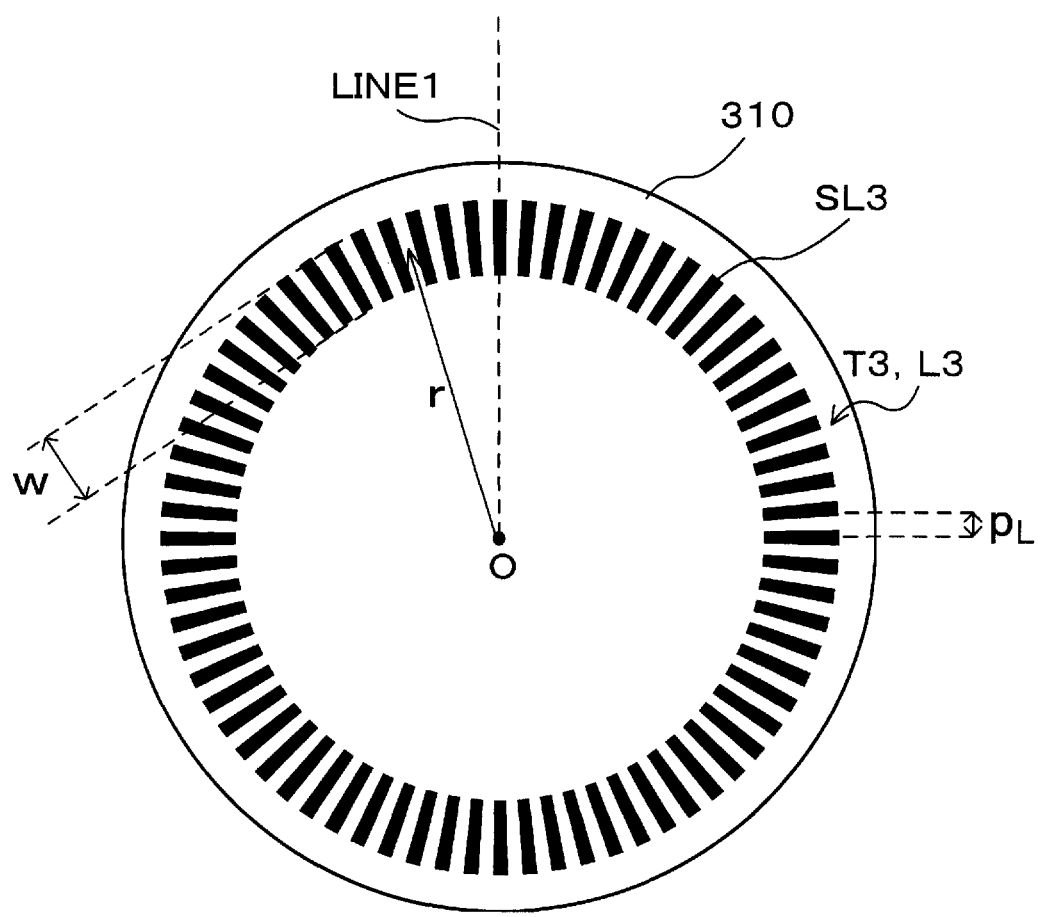
FIG. 10 is a diagram for explaining a disk of a rotary encoder according to comparative example 1.
Figure 11:
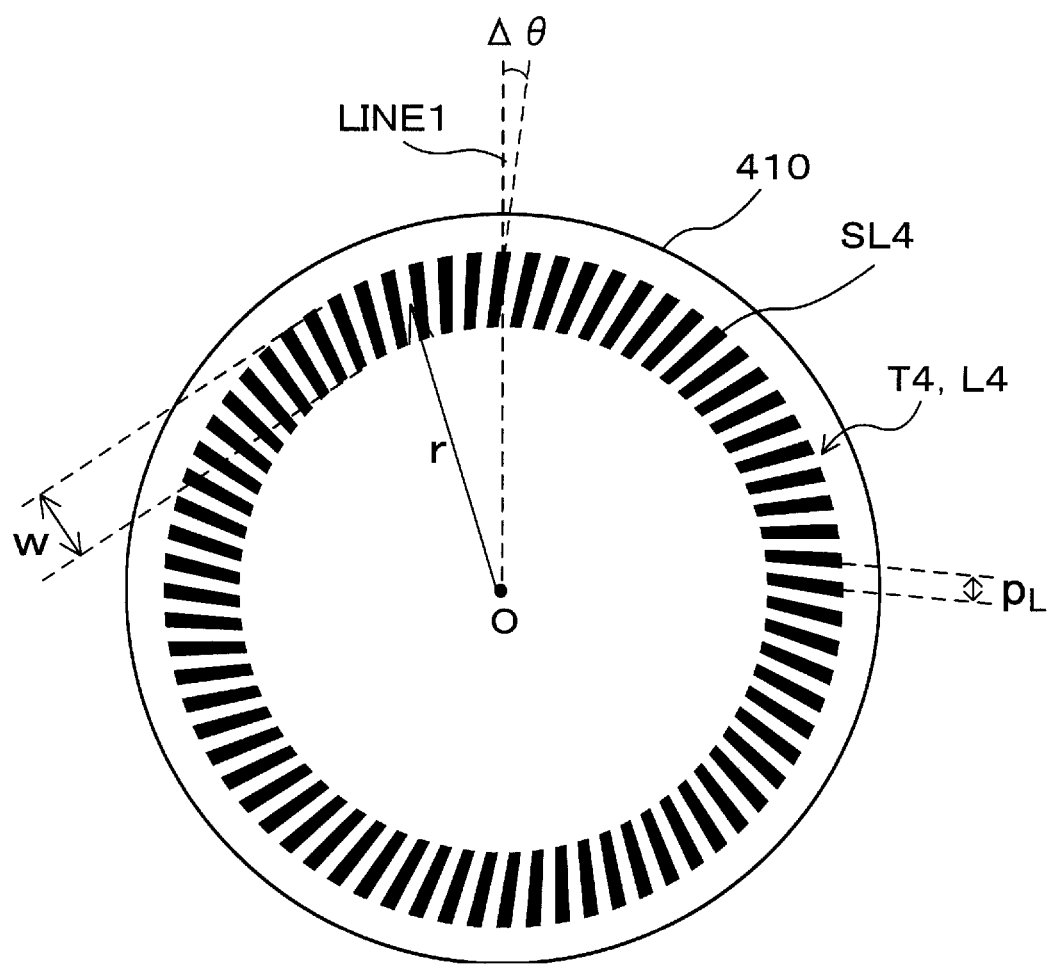
FIG. 11 is a diagram for explaining a disk of a rotary encoder according to comparative example 2.

Next, referring to FIG. 8, a method of manufacturing the encoder 100 according to the embodiment will be described. FIG. 8 is a flowchart for explaining a method of manufacturing the rotary encoder according to the embodiment.

As shown in FIG. 8, in the method of manufacturing the encoder 100, a process in step S101 is performed. In step S101 (an example of a step of determining the number of slits), the number "m" of cycles of a desired period signal to be obtained in one rotation is determined according to resolution desired to be obtained from one track T in the disk 110. According to the period, the number "n" of slits to be formed in the track T is set. The flow advances to step S103.

In step S103 (an example of a step of setting radial lines), as shown in FIG. 6, the radial lines LINE1 of the number determined in step S101 are set at equal angles about the disk center O (rotation axis AX) as a center. The flow advances to step S105.

In step S105 (an example of a step of setting curved lines), the curve degree C. is set so that the pitch $p_L$ of the slits SL becomes a desired value. The plurality of radial lines LINE1 set in step S103 are curved in the same circumferential direction at the set curve degree C., thereby setting the plurality of curved lines LINE2. For example, in the case of radial slits like in the track TC, in step S105, the curve degree C. is set to zero (it means that the lines are not curved).

In step S105, the curve degree C. is set so that the pitch $p_L$ of the slits SL in the track T (an example of one track) to be formed becomes equal to the pitch $p_L$ of the slits SL in the track T (an example of another track T) already formed or to be formed subsequently. After the process in step S105, the flow advances to step S107.

In step S107 (an example of a step of forming slits), along the plurality of curved lines LINE2 set in step S105, the plurality of slits SL are formed in the track T with predetermined width "w". The flow advances to step S109.

In step S109, whether the slits SL are formed in all of the desired plurality of tracks T or not is determined. When there is a track T in which the slits SL are not formed yet, the processes after step S101 are repeated. On the other hand, when all of the slits SL are formed, the flow advances to step S111.

In step S111 (an example of a step of disposing a mask), for two or more tracks T in which at least the pitches $p_L$ are equal, the detector 130 including the mask 120 is disposed so that the gaps "g" between the rotating grating L and the fixed gratings G1 and G2 become equal.

Simultaneously with or before or after those processes, a process of coupling the rotary shaft 101 to the disk 110, a process of coupling the detectors 130 and the position data generator 140, a process of housing the components in a case and supporting them fixedly or rotatably, and the like are performed, thereby completing the encoder 100. The detailed description of the processes will not be given here.

1-5 Example of Effect Produced by Rotary Encoder System According to First Embodiment The rotary encoder, the rotary motor, the rotary motor system, the disk, and the method of manufacturing the rotary encoder according to the first embodiment of the invention have been described above.

In the encoder 100 and the like according to the embodiment, the plurality of slits SL in at least one track T are formed as curved slits along the curved line LINE2. The pitch $p_L$ of the curved slits can be adjusted by adjusting the curve degree C. of the curved line LINE2 without changing the formation position of the track T and the number "n" of slits included in the track T. Therefore, the degree of freedom in designing, development, and the like can be increased.

As the curved slits used in the encoder 100 and the like, the length of each of the slits SL can be increased according to the curve degree C. As a result, a change amount in the slit formation direction of the pitch $p_L$ of the slits SL can be reduced. It means that the pitches $p_L$ of the slits SL can be made uniform in the slit formation direction, that is, the slits SL as curved slits can be made close to parallel slits. On the other hand, the encoder 100 according to the embodiment uses a diffraction interference optical system using the curved slits. In the diffraction interference optical system, the more the plurality of slits SL are close to parallel slits, the S/N ratio of a detection signal and the like can be improved, and detection precision can be improved. Therefore, in the encoder 100 according to the embodiment, by forming the plurality of slits SL as curved slits, they can be made close to parallel slits. Thus, the S/N ratio of a detection signal and the like can be improved, and detection precision can be improved.

Therefore, in the encoder 100 according the embodiment, by using the diffraction interference light, while improving detection precision, restriction and the like at the time of designing and development at the time of constructing a diffraction interference optical system are reduced, and designing, development, and the like can be performed so as to facilitate manufacture.

Such an effect is particularly effective in the case of setting the track radius "r" to be large and in the case of setting the number $m_L$ of cycles of the period signals to be small. That is, usually, to form the diffraction interference optical system, when the track radius "r" is increased, the pitch $p_L$ of slits SL can be made sufficiently low so that the diffraction interference optical system can be formed. The number "n" of slits inevitably increases, and the number $m_L$ of period signals corresponding to the number "n" of slits also increases. On the other hand, similarly, in the case of setting the number $m_L$ of cycles to be small, the track radius "r" has to be made small. However, as described above, in the encoder 100 according to the embodiment, by adjusting the curve degree C., the number "n" of slits or the track radius "r" can be independently adjusted. Therefore, restrictions at the time of designing and development are largely reduced, and miniaturization can be also possible.

In the embodiment, the absolute encoder is described as the encoder 100. However, also in the case of applying the embodiment to an incremental encoder, the action, effect, and the like of the curved slits in one track T described above are similarly produced. In this case, for example, the plurality of slits SL in one or more tracks T are formed as curved slits.

On the other hand, in the case where the embodiment is applied to the absolute encoder 100 as in the embodiment, by forming the slits in at least one track T as curved slits, the pitches $p_L$ in two or more tracks T can be made almost equalized. As a result, the gaps "g" between the detectors 130 (that is, the masks 120) for the tracks T and the tracks T can be made almost equal to each other. Therefore, the diffraction interference optical systems for the tracks T can be almost similarly designed, developed, and the like, and the gaps "g" for the detectors 130 corresponding to the tracks T can be simultaneously adjusted. Therefore, designing, development, manufacture, and the like can be largely facilitated.

1-6 Example of Rotary Encoder According to First Embodiment

The above-described effect will be described more specifically so that the effect of the encoder 100 and the like according to the embodiment becomes more clarified while comparing an example of the encoder 100 according to the embodiment with comparative examples of encoders having configurations different from that of the embodiment.

For convenience of explanation, only one track T was formed in the disk 110, and the action, effect, and the like in the one track T were compared. Obviously, the encoder 100 and the like according to the embodiment can produce other actions and effects as described in the foregoing embodiment in addition to the action, effect, and the like to be described below.

To perform comparison, in the encoder 100 according to an example of the embodiment, the radius (track radius) "r" in the center in the width "w" direction of the track T in the disk 110 was set to 8 mm, and the track width "w" (thickness in the radial direction) was set to 0.5 mm. In the track T, 512 pieces of curved slits SL in the rotating grating T of the disk 110 were formed along the curved line LINE2 so that the pitch $p_L$ of the slits SL at the track radius "r"=8 mm becomes 20 μm. In this case, the width of the slit SL was set to 10 μm which is the half of the pitch $p_L$. The encoder of the example was formed by forming the fixed gratings G1 and G2 at a pitch of 40 μm so as to satisfy "$p_{G1}=2 \times p_L=p_{G2}$" along the direction of the tangent line of the curved rotating grating L and to obtain 512/rotation as the number "m" of cycles of the period signals per rotation. The gaps "g" as distances between the fixed gratings G1 and G2 and the rotating grating L were set to 0.9 mm which is twice as large as $g=p_L^2/\lambda$ since an LED having a wavelength λ of 880 nm was used as a light source.

In contrast, to clarify the action, effect, and the like of the encoder according to the example of the embodiment, encoders according to comparative examples were prepared; an encoder (comparative example 1) having a disk 310 in which only radial slits which are not curved are formed so as to similarly obtain a period signal having the number "m" of cycles of 512 in tracks T3 to T5 (r=8 mm and w=0.5 mm), an encoder (comparative example 2) having a disk 410 in which only inclined slits which are inclined at a predetermined angle Δθ with respect to the circumference direction are formed without making the radial slits curved, and an encoder (comparative example 3) having a disk 510 in which only multiple spiral slits as described in Japanese Unexamined Patent Application Publication No. H06-347293 are formed.

More concretely, to make the setting conditions of the tracks T3 to T5 and those of the gaps "g" the same as those of the example, also in the comparative examples 1 to 3, the width of the slit SL was set to the half of the pitch p, the track radius "r" was set to 8 mm, the track width "w" was set to 0.5 mm, and the gap "g" was set to 0.9 mm. To obtain a period signal of the same number of cycles (m=512/rotation), also in the comparative examples 1 to 3, 512 slits SL3, 512 slits SL4, and 512 slits SL5 were formed in different forms in the tracks T, respectively.

In the comparative example 1, the 512 slits SL3 in the rotating grating L were formed along the radial lines LINE1 drawn at equal intervals from the disk center O.

In the comparative example 2, the radial lines LINE1 in the comparative example 1 were not curved but were inclined at Δθ=0.35 degree in the circumferential direction of the track T, and the slits SL4 were formed along the inclined lines.

In the comparative examples 1 and 2, the fixed gratings G1 and G2 were formed as parallel slits and disposed so as to be almost parallel to at least a part of the rotating gratings L3 and L4.

Figure 12:
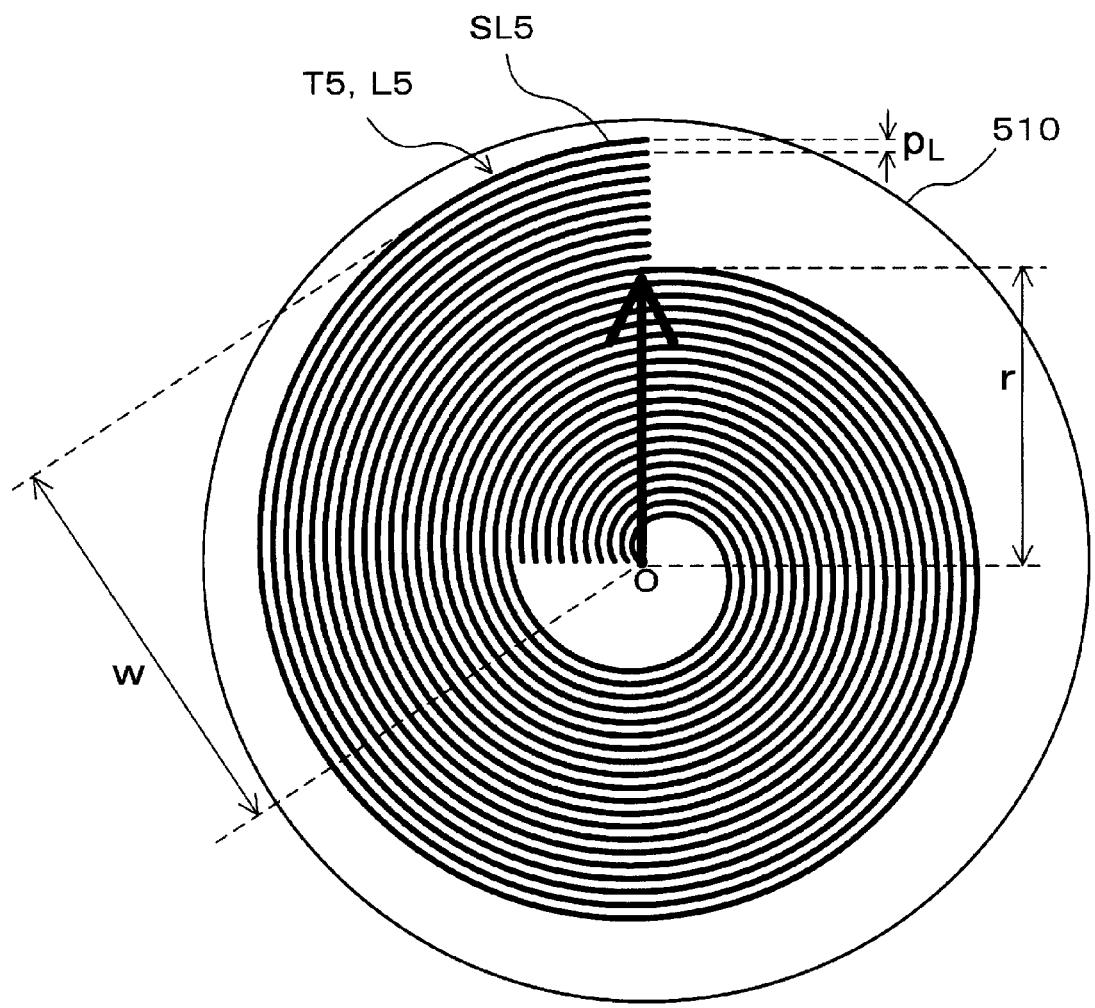
FIG. 12 is a diagram for explaining a disk of a rotary encoder according to comparative example 3.

On the other hand, in the comparative example 3, 512 slits SL5 were formed spirally by one turn or more around the disk center O as a center so as to be within the track T5. In FIG. 12, all of the 512 slits SL5 are not shown but the slits are drawn conceptually. In the comparative example 3, the fixed gratings G1 and G2 were formed as parallel slits and disposed in parallel to a spiral tangent line in the disk 510.

As shown in Table 1, in the case where the track radius "r" is set to 8 mm in the comparative examples 1 to 3 formed as described above, the pitch $p_L$ becomes 98 μm in the comparative examples 1 and 2 and becomes 0.98 μm in the comparative example 3.

In the comparative examples 1 and 2, the pitch $p_L$ becomes 98 μm and large, so that it is difficult to form an encoder using the diffraction interference phenomenon. On the other hand, in the comparative example 3, the pitch $p_L$ becomes 0.98 μm and small. Consequently, high manufacture precision is required for the rotating grating L and the fixed gratings G1 and G2, and it is difficult to manufacture the encoder. The pitches $p_L$ cannot be set to a value (20 μm) optimum for the gap "g".

In contrast, in the embodiment, by adjusting the curve degree C. and the like, the pitch $p_L$ can be adjusted to the value 20 μm optimum for the gap "g".

The pitch $p_L$, in the comparative examples 1 and 2 and the number "m" of cycles satisfy the relation "$m=2\pi r/p_L$". On the other hand, the pitch $p_L$ in the comparative example 3 and the number "m" of cycles satisfy the relation "$m \leq 2\pi r/p_L$" but, when q is the number of turns of the spiral, the relation "$p_L=2w/(q \times m)$" is satisfied. That is, in the case where the number "m" of cycles is desired to be changed while maintaining the track radius "r" or the like constant, the value of the pitch $p_L$ in the rotating gratings L3 to L5 has to be inevitably changed in the comparative examples 1 to 3. As a result, the gap "g" optimum for the pitch $p_L$ has to be also changed.

In contrast, the pitch $p_L$ in the example and the number "m" of cycles satisfy the relation "$m \leq 2\pi r/p_L$". By adjusting the curve degree C. of the rotating grating L, the pitch $p_L$ can be freely set within the range of satisfying the relation. Therefore, in a state where the pitch $p_L$ is constant and the gap "g" is constant, the number "m" of cycles can be changed.

If the pitch $p_L$, in the comparative examples 1 to 3 is set to the same as that in the example ($p_L=20$ μm), to obtain the period signal of 512 cycles by 512 slits SL3 to SL5, the track radius "r" has to be set to 1.63 mm in the comparative examples 1 and 2. In the comparative example 3, the track radius "r" has to be set to 10.24 mm or larger so that the track width becomes 10.24 mm or larger. Therefore, in this case, layout of the fixed gratings G1 and G2 and the light receiver 132 have to be inevitably changed. Further, in this case, when the track radius "r" is very small like 1.63 mm like in the comparative examples 1 and 2, the spread angle between slits becomes too large, that is, the change rate of the pitch $p_L$ becomes too large, and it is difficult to use the diffraction interference phenomenon. On the other hand, when the track radius "r" becomes large like 10.24 mm like in the comparative example 3, a large disk 110 is required, and the encoder itself becomes larger.

Meanwhile, a result of comparison between a period signal obtained in the example and period signals obtained from the comparative examples 1 to 3 is as follows. Specifically, in the comparative examples 1 and 2 in which the track radius "r" was maintained as 8 mm, the pitch $p_L$ was very high as 98 μm, and a period signal by the diffraction interference optical system could not be obtained (−). In the case where the pitch $p_L$ was set to 20 μm, in the comparative example 1 using the radial slits, the change rate of the pitch $p_L$ was large, the period signal was largely apart from a sine-wave signal, and the signal characteristic was poor (poor). In the comparative example 2 using the inclined slits, the change rate of the pitch $p_L$ was low because of the inclined slits and the period signal became closer to a sine-wave signal, but the signal characteristic was insufficient (moderate).

In the comparative example 3, in the case where the track radius "r" was maintained at 8 mm, the slit pitch $p_L$ became very low as 0.98 μm, and the optimum gap occurs in multiples of 2 μm. That is, an output is fluctuated every fluctuation of the gap of 2 μm (poor). In the case of uniformly setting the pitch $p_L$, to 20 μm, the range in which the shape of the multiple spiral slit and that of the fixed grating G2 formed with equal pitch in the radial direction match each other is small, and it is difficult to obtain sufficient signal characteristic (moderate).

In contrast, in the example, since the slits SL are formed in a curved shape, the region in which the slits SL become parallel increases, the period signal becomes almost a sine-wave signal, and a very good signal characteristic can be realized (excellent).

TABLE 1

|  | Example | Comparative example 1 | | Comparative example 2 | | Comparative example 3 | |
|---|---|---|---|---|---|---|---|
| Number m of cycles (/rotation) | 512 | 512 | | 512 | | 512 | |
| Track radius r (mm) | 8 | 8 | 1.63 | 8 | 1.63 | 8 | 10.24 or more |
| Track width (mm) | 0.5 | 0.5 | 0.5 | 0.5 | 0.5 | 0.5 | 10.24 or more |
| Number n of slits (pieces) | 512 | 512 | | 512 | | 512 | |
| Slit shape | Curved and inclined | Radial | | Inclined without curved | | Multiple spiral | |
| Slit pitch $p_L$ (μm) | 20 | 98 | 20 | 98 | 20 | 0.98 | 20 |
| Slit formation direction | Tangent direction of rotating slits | Parallel to rotating slits | | Parallel to rotating slits | | Circumferential direction of disk | |
| Gap g (mm) | 0.9 | 0.9 | 0.9 | 0.9 | 0.9 | 0.9 | 0.9 |
| Optimum gap | Multiples of 0.9 mm | Multiples of 21.9 mm | Multiples of 0.9 mm | Multiples of 21.9 mm | Multiples of 0.9 mm | Multiples of 0.002 mm | Multiples of 0.9 mm |
| Uniformity of pitch $p_L$ for radius r | $p_L$ gently increases from inside diameter side toward outside diameter side | $p_L$ increases from inside diameter side toward outside diameter side | | $p_L$ increases from inside diameter side toward outside diameter side | | $p_L$ is equal interval for r | |
| Setting of the number m of cycles | Arbitrary m can be set by adjusting C within m ≤ $2\pi r/p_L$ | The number m of cycles is determined at m = $2\pi r/p_L$ (m depends on $P_L$) | | The number m of cycles is determined at m = $2\pi r/p_L$ (m depends on $P_L$) | | m is determined with m ≤ $2\pi r/p_L$ but $p_L$ = 2w/(q × m) (m depends on $P_L$) | |
| Relation between track radius r and rotation slit pitch $p_L$ | By adjusting C, combination of arbitrary r and $p_L$ can be realized | When r is maintained, $p_L$ increases. When $p_L$ is maintained, r decreases. | | When r is maintained, $p_L$ increases. When $p_L$ is maintained, r decreases. | | When r is maintained, $p_L$ decreases largely. When $p_L$ is maintained, r increases. | |
| Characteristic of signal | excellent | — | poor | — | moderate | poor | moderate |

As shown in Table 1, in the encoder according to the example, as compared with the encoders according to the comparative examples 1 to 3, the pitch $p_L$ can be adjusted easily and, moreover, a very excellent signal characteristic can be realized.

2 Second Embodiment

The rotary motor system according to the first embodiment has been described above.

Figure 13:
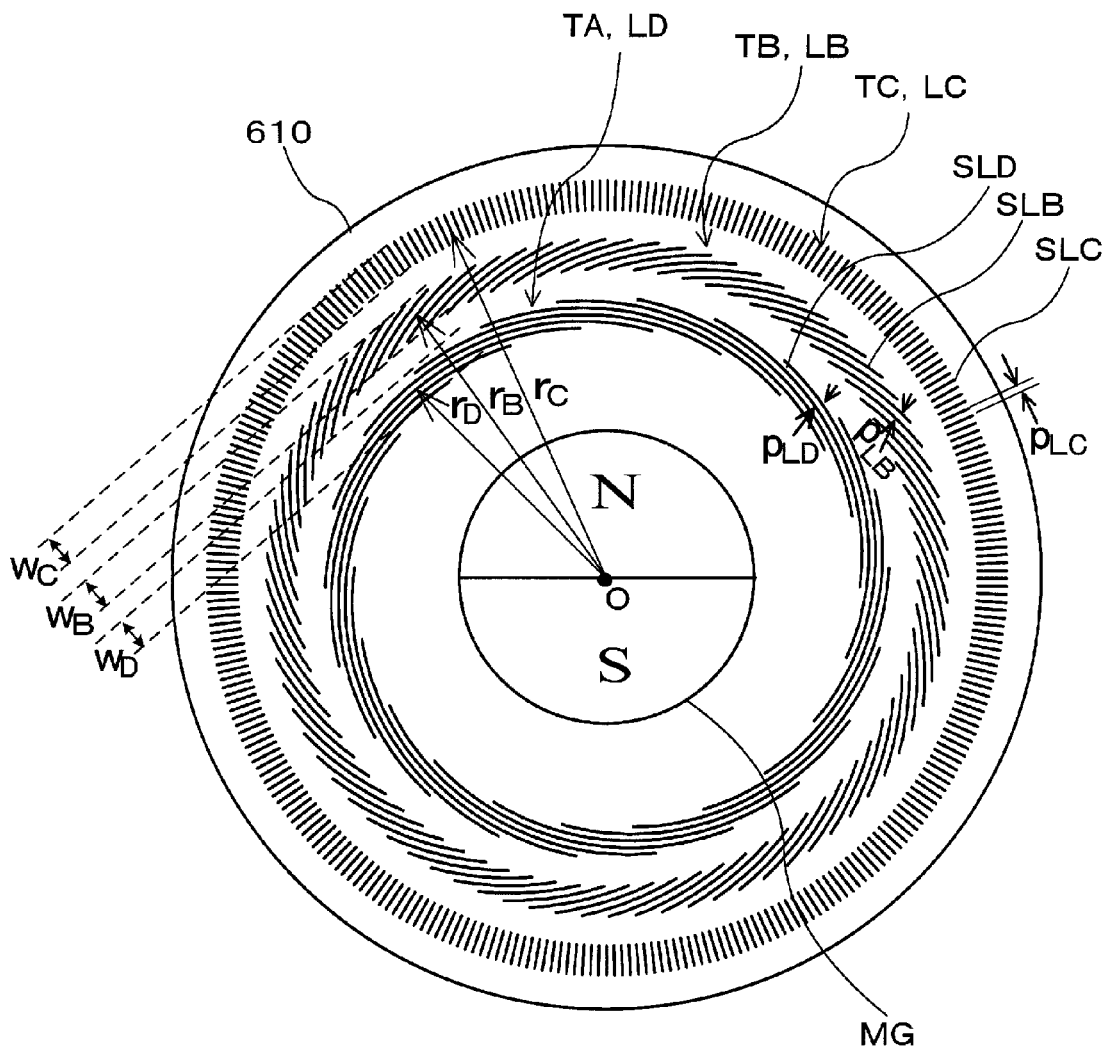
FIG. 13 is a diagram for explaining the configuration of a disk of a rotary encoder according to a second embodiment of the invention.

Next, with reference to FIG. 13, a rotary motor system according to a second embodiment of the invention will be described. FIG. 13 is a diagram for explaining the configuration of a disk of a rotary encoder according to the second embodiment of the invention.

In the first embodiment of the present invention, the case where the directions of curving the slits SLA and SLB in the tracks TA and TB formed as curved slits are the same circumference direction as shown in FIG. 3 has been described. The invention, however, is not limited to the case. The curve directions of adjacent tracks can be made opposite in the circumferential direction. As the second embodiment of the invention, the case where the curve directions of adjacent tracks are set opposite to each other in the circumferential direction will be described. Since the encoder according to the embodiment and the like can be constructed in a manner similar to the first embodiment except that the curve directions of tracks are set opposite to each other in the circumferential direction, the differences from the first embodiment will be mainly described here.

As shown in FIG. 13, a disk 610 of the encoder according to the embodiment has a rotating grating LD in place of the rotating grating LA shown in FIG. 3 in the track TA (an example of at least one track). The rotating grating LD has a plurality of slits SLD.

Different from the slit SLA shown in FIG. 3, the curve direction of the slit SLD is set in the circumferential direction opposite to that of the slit SLB in the adjacent track TB (an example of another track). That is, the slit SLB is formed along the curved line LINE2 obtained by making the radial line LINE1 curved clockwise. On the other hand, the slit SLD is formed along a curved line obtained by making the radial line LINE1 curved counterclockwise.

On the other hand, diffraction interference light generated from the slits SL forms an interference pattern which repeats in a direction almost at a right angle with respect to the longitudinal direction of each of the slits SL. The longitudinal direction of the slit SL as the curved slit becomes close from the radial direction toward the circumferential direction of the disk when the slit is curved. Therefore, there is a case that the interference pattern is formed so as to repeat in the direction of an adjacent track. As a result, it is feared that a crosstalk occurs between the interference pattern and the diffraction interference optical system of an adjacent track. To prevent such a crosstalk, designing and development of the encoder may be restricted.

In such a case, by setting the curve directions of the slits SLD and SLB in the adjacent tracks TA and TB in directions opposite to each other as in the embodiment, the direction of formation of the interference pattern can be changed, and designing and development which prevents occurrence of a crosstalk can be easily performed.

Obviously, also in the second embodiment, other special action, effect, and the like produced in the first embodiment can be produced.

3 Third Embodiment

The rotary motor system according to the second embodiment of the invention has been described above.

Figure 14:
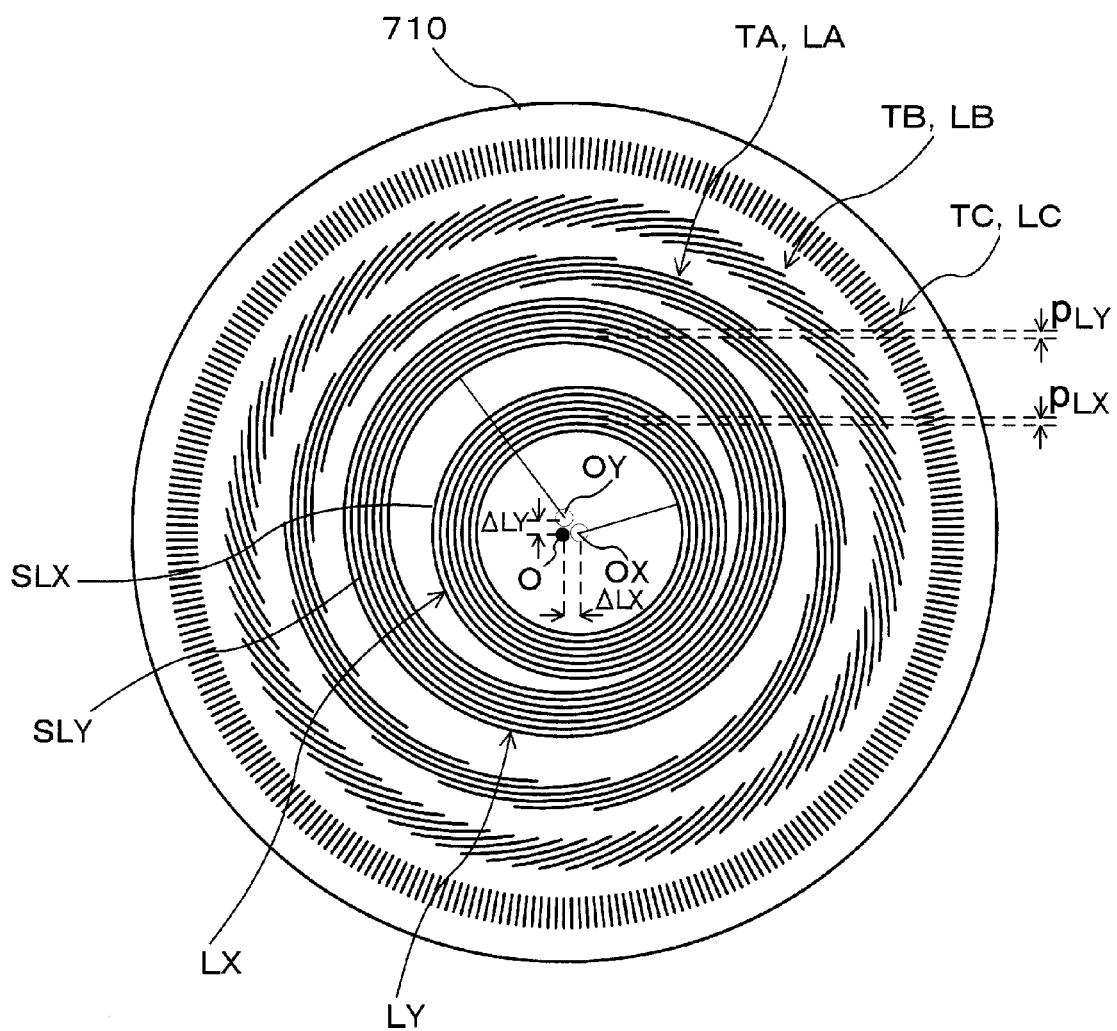
FIG. 14 is a diagram for explaining the configuration of a disk of a rotary encoder according to a third embodiment of the invention.

Next, with reference to FIG. 14, a rotary motor system according to a third embodiment of the invention will be described. FIG. 14 is a diagram for explaining the configuration of a disk of a rotary encoder according to the third embodiment of the invention.

In the first and second embodiments of the present invention, the case where the magnet MG is used as the 1× detecting mechanism has been described. However, as described above, the 1× detecting mechanism is not limited as long as it can roughly detect the absolute position "x" of the motor unit 200 in one rotation. As the third embodiment of the invention, another example of the 1× detecting mechanism will be described. Note that the 1× detecting mechanism described here is also just an example, and another 1× detecting mechanism can be used. Since the components other than the 1× detecting mechanism can be constructed in a manner similar to the first and second embodiments, the differences from the first and second embodiments will be mainly described here.

As shown in FIG. 14, in a disk 710 of the encoder of the embodiment, two or more optical rotating gratings LX and LY are formed in place of the magnet MG.

The rotating gratings LX and LY have a plurality of slits SLX and SLY which are not radial slits or curved slits, different from the rotating gratings LA to LC.

The plurality of slits SLX are formed in multiple concentric circles having a pitch $p_{LX}$, and the plurality of slits SLY are formed in multiple concentric circles having a pitch $p_{LY}$. Desirably, the pitches $p_{LX}$ and $p_{LY}$ are set to be equal to the pitches $p_{LA}$ to $p_{LC}$ of the slits SLA to SLC ($p_L = p_{LA} = p_{LB} = p_{LC} = p_{LX} = p_{LY}$). The slits SLX and SLY are formed in a manner similar to the slits SLA to SLC except for the shapes.

The plurality of slits SLX in the multiple concentric circle shape are formed around a point OX as a center, which is deviated from the disk center O only by the first pitch $p_{LX}$ in a first direction. The plurality of slits SLY in the multiple concentric circle shape are formed around a point OY as a center, which is deviated from the disk center O only by the first pitch $p_{LY}$ in a second direction different from the first direction by 90°.

Facing the slits SLX and SLY, in place of the detector MX shown in FIG. 2, two detectors 130 similar to the detectors 130A to 130C are disposed in a one-to-one corresponding manner. The detector 130 corresponding to the slits SLX will be called a "detector 130X" (not shown), and the detector 130 corresponding to the slits SLY will be called a "detector 130Y" (not shown). The detectors 130X and 130Y are different from the detectors 130A to 130C, and the fixed grating G2 of the mask 120 does not have to be divided in the plurality of regions G2A and G2B. The detectors 130X and 130Y are disposed so that the slits SG1 and SG2 of the fixed gratings G1 and G2 of the masks 120 are parallel to the tangent lines of the slits SLX and SLY of the corresponding concentric circles. As a result, the slits SLX and the corresponding detector 130X construct a diffraction interference optical system of three gratings similar to the above-described optical detecting mechanism. The slits SLY and the corresponding detector 130Y also construct a diffraction interference optical system of three gratings similar to the optical detecting mechanism.

Since the points OX and OY of the centers of the slits SLX and SLY are deviated from the disk center O only by one pitch $p_{LX}$ or $p_{LY}$, a 1× signal in a sine wave shape whose one cycle corresponds to one rotation of the disk 710 can be obtained from the two diffraction interference optical systems constructed as described above. Since the directions of deviations from the disk center O of the center points OX and OY of the slits SLX and SLY are deviated by 90°, 1× signals of the A phase and the B phase which are out from each other by 90° can be generated from the two diffraction interference optical systems.

Therefore, the position data generator 140 can generate a rough absolute position "x" of the motor unit 200 by using the 1× signals obtained from the slits SLX and SLY in place of the 1× signals from the magnet MG. In a manner similar to the first embodiment, the position data generator 140 can specify the high-precision absolute position "x" from the 1× signals and other period signals and output the position data to the controller 20.

In the third embodiment, without using magnetism as the 1× detecting mechanisms, as the detectors 130X and 130Y, configurations similar to the position detectors 130A to 130C can be used. Further, by setting the pitches $p_{LX}$ and $p_{LY}$ of the slits SLX and SLY to be equal to the pitches $p_{LA}$ to $p_{LC}$ of the slits SLA to SLC, the gap "g" for the detectors 130X and 130Y and the gap "g" for the position detectors 130A to 130C can be set to the same value. As a result, the encoder of the third embodiment can be manufactured easier than the encoders and the like of the first and second embodiments, and the manufacture cost can be also reduced.

Obviously, numerous modifications and variations of the present invention are possible in light of the above teachings. It is therefore to be understood that within the scope of the appended claims, the invention may be practiced otherwise than as specifically described herein.

In the specification, the steps written in the flowcharts include processes which are performed time-sequentially along the written order and also processes which are not necessarily performed time-sequentially but performed in parallel or individually. Obviously, the steps processed time-sequentially may be processed in different orders in some cases.

What is claimed is:

1. A rotary encoder comprising:
   a disc-shaped disk disposed rotatably about a rotation axis and having a first ring-shaped track in which a first optical rotating grating is formed and a second ring-shaped track in which a second optical rotating grating is formed; and at least one optical fixed grating disposed fixedly so as to face the disk so that the fixed grating and the first and second optical rotating gratings construct a diffraction interference optical system, wherein each of a plurality of slits included in the first rotating grating in the first track is formed along a curved line obtained by making each of a plurality of radial lines using the rotation axis as a center curved in the circumferential direction at a predetermined curve degree so that a pitch of the slits is set to a predetermined value, and wherein the first track is radially spaced apart from the second track such that a gap is provided between the first track and the second track.

2. The rotary encoder according to claim 1, wherein the curve degree in the slits in the first track is set so that the pitch of the slits in the first track becomes equal to a pitch of slits in the second track.

3. The rotary encoder according to claim 2, wherein a gap between a rotating grating in the first track and at least one of the fixed gratings corresponding to the rotating grating is equal to a gap between a rotating grating in the second track and at least one of the fixed gratings corresponding to the rotating grating.

4. The rotary encoder according to claim 2, wherein a curve degree in the slits in the first track is different from that in the slits in the second track.

5. The rotary encoder according to claim 1, wherein a curve direction of the slits in the first track is a circumferential direction opposite to a curve direction of the slits in the second track adjacent to the first track.

6. The rotary encoder according to claim 1, wherein a plurality of slits included in the rotating grating in the first track are reflection slits, and the two fixed gratings corresponding to the one rotating grating are disposed on an identical face side of the disk.

7. The rotary encoder according to claim 1, wherein the fixed grating corresponding to the first track in which the slits are formed along the curved line is formed parallel to a tangent line of the curved line.

8. The rotary encoder according to claim 1, wherein each of a plurality of slits included in the second rotating grating in the second track is formed along another curved line obtained by making each of another plurality of radial lines using the rotation axis as another center curved in the circumferential direction at another predetermined curve degree so that a pitch of the slits of the second track is set to another predetermined value.

9. The rotary encoder according to claim 1, wherein the disc-shaped disk further comprises a third ring-shaped track in which a third optical rotating grating is formed, and wherein each of a plurality of slits included in the third rotating grating in the third track is formed along radial lines from the rotation axis.

10. The rotary encoder according to claim 9, wherein the third ring-shaped track is an outermost track on the disc-shaped disk.

11. The rotary encoder according to claim 10, wherein the third track is radially spaced apart from the second track such that a gap is provided between the second track and the third track.

12. The rotary encoder according to claim 1, wherein a number of slit provided in the first track is different than a number of slits provided in the second track.

13. A rotary motor system comprising:
a motor unit that rotates a rotary shaft;
a rotary encoder that is coupled to the rotary shaft and measures a position of the rotary shaft; and
a controller that controls rotation of the motor unit based on the position detected by the rotary encoder,
wherein the rotary encoder includes
a disc-shaped disk disposed rotatably about a rotation axis in accordance with rotation of the rotary shaft and having a first ring-shaped track in which a first optical rotating grating is formed and a second ring-shaped track in which a second optical rotating grating is formed; and
at least one optical fixed grating disposed fixedly so as to face the disk so that the fixed grating and the first and second optical rotating gratings construct a diffraction interference optical system,
wherein each of a plurality of slits included in the first rotating grating in the first track is formed along a curved line obtained by making each of a plurality of radial lines using the rotation axis as a center curved in the circumferential direction at a predetermined curve degree so that a pitch of the slits is set to a predetermined value, and
wherein the first track is radially spaced apart from the second track such that a gap is provided between the first track and the second track.

14. The rotary motor system according to claim 13, wherein each of a plurality of slits included in the second rotating grating in the second track is formed along another curved line obtained by making each of another plurality of radial lines using the rotation axis as another center curved in the circumferential direction at another predetermined curve degree so that a pitch of the slits of the second track is set to another predetermined value.

15. The rotary motor system according to claim 13, wherein the disc-shaped disk further comprises a third ring-shaped track in which a third optical rotating grating is formed, and wherein each of a plurality of slits included in the third rotating grating in the third track is formed along radial lines from the rotation axis.

16. The rotary motor system according to claim 15, wherein the third ring-shaped track is an outermost track on the disc-shaped disk, and wherein the third track is radially spaced apart from the second track such that a gap is provided between the second track and the third track.

17. The rotary motor system according to claim 13, wherein a number of slit provided in the first track is different than a number of slits provided in the second track.

* * * * *